(12) United States Patent
Roberto et al.

(10) Patent No.: US 11,319,418 B2
(45) Date of Patent: May 3, 2022

(54) SEALABLE AND PEELABLE POLYESTER FILM

(71) Applicant: Cryovac, Inc., Charlotte, NC (US)

(72) Inventors: Forloni Roberto, Rho (IT); Serena Stracuzzi, Parabiago (IT)

(73) Assignee: Cryovac, LLC, Charlotte, NC (US)

( * ) Notice: Subject to any disclaimer, the term of this patent is extended or adjusted under 35 U.S.C. 154(b) by 1034 days.

(21) Appl. No.: 15/531,106

(22) PCT Filed: Nov. 26, 2015

(86) PCT No.: PCT/EP2015/077805
§ 371 (c)(1),
(2) Date: May 26, 2017

(87) PCT Pub. No.: WO2016/083521
PCT Pub. Date: Jun. 2, 2016

(65) Prior Publication Data
US 2017/0321024 A1    Nov. 9, 2017

(30) Foreign Application Priority Data

Nov. 27, 2014   (EP) .................................. 14195282

(51) Int. Cl.
*C08J 7/04*       (2020.01)
*C09D 167/02*   (2006.01)
(Continued)

(52) U.S. Cl.
CPC ................. *C08J 5/18* (2013.01); *B32B 27/08* (2013.01); *B32B 27/36* (2013.01); *B65D 33/02* (2013.01);
(Continued)

(58) Field of Classification Search
CPC . B32B 27/36; B32B 2255/10; B32B 2255/26; B32B 27/08; C08J 5/18;
(Continued)

(56) References Cited

U.S. PATENT DOCUMENTS 2,762,720 A   9/1956  Michel
4,120,716 A   10/1978 Bonet
(Continued)

FOREIGN PATENT DOCUMENTS

EP   1529797   5/2005
EP   2178701   9/2011
(Continued)

OTHER PUBLICATIONS

Updegraff, Ivor H., Amorphous Polymers, Encyclopedia of Polymer Science and Engineering, 2nd Ed., 1985, pp. 789-842, US, J. Wiley & Sons, Inc..

*Primary Examiner* — Yan Lan
(74) *Attorney, Agent, or Firm* — Jason R. Womer

(57) ABSTRACT

The invention discloses bi-axially oriented coated polyester films having high tear initiation resistance and comprising a polyester base film and a heat sealable coating, said heat sealable coating comprising one or more amorphous copolyester(s) comprising units of terephthalic acid, naphthalene dicarboxylic acid and at least one diol. The films are heat-sealable and peelable to polyester and aluminium containers. The invention also relates to a process for the manufacturing of such films, to the use of said films in food packaging and to the packages obtained therefrom.

13 Claims, 1 Drawing Sheet

(51) Int. Cl.
*B65D 33/02* (2006.01)
*B65D 77/20* (2006.01)
*C08J 5/18* (2006.01)
*C09D 167/00* (2006.01)
*C08G 63/189* (2006.01)
*B32B 27/36* (2006.01)
*B32B 27/08* (2006.01)
*C08J 7/043* (2020.01)
*C08J 7/052* (2020.01)
*C08J 7/054* (2020.01)

(52) U.S. Cl.
CPC ............ *B65D 77/20* (2013.01); *C08G 63/189* (2013.01); *C08J 7/043* (2020.01); *C08J 7/0427* (2020.01); *C08J 7/052* (2020.01); *C08J 7/054* (2020.01); *C09D 167/00* (2013.01); *C09D 167/02* (2013.01); *B32B 2255/10* (2013.01); *B32B 2255/26* (2013.01); *C08J 2367/00* (2013.01); *C08J 2467/02* (2013.01)

(58) Field of Classification Search
CPC .. C08J 2467/02; C08J 2367/00; C08J 7/0427; C08J 7/043; C08J 7/052; C08J 7/054; C08J 7/04; C08J 7/047; B65D 33/02; B65D 77/20; B65D 81/34; C09D 167/02; C09D 167/00; C08G 63/189; B05D 7/04
USPC .............................. 428/323, 336; 264/210.1
See application file for complete search history.

(56) References Cited

U.S. PATENT DOCUMENTS

| | | |
|---|---|---|
| 5,972,445 A | 10/1999 | Kimura et al. |
| 7,144,615 B2 | 12/2006 | Peiffer et al. |
| 7,368,165 B2 * | 5/2008 | Sankey .................. B29C 48/08 428/336 |
| 2004/0033382 A1 | 2/2004 | Kendig |
| 2005/0042468 A1 | 2/2005 | Peiffer et al. |
| 2005/0118412 A1 * | 6/2005 | Peiffer .................. B32B 27/36 428/323 |

FOREIGN PATENT DOCUMENTS

| | | |
|---|---|---|
| EP | 2765092 | 9/2015 |
| EP | 2714390 | 4/2017 |
| JP | H10315417 | 12/1998 |
| JP | 2004306275 | 11/2004 |
| WO | 2007093495 | 8/2007 |

* cited by examiner

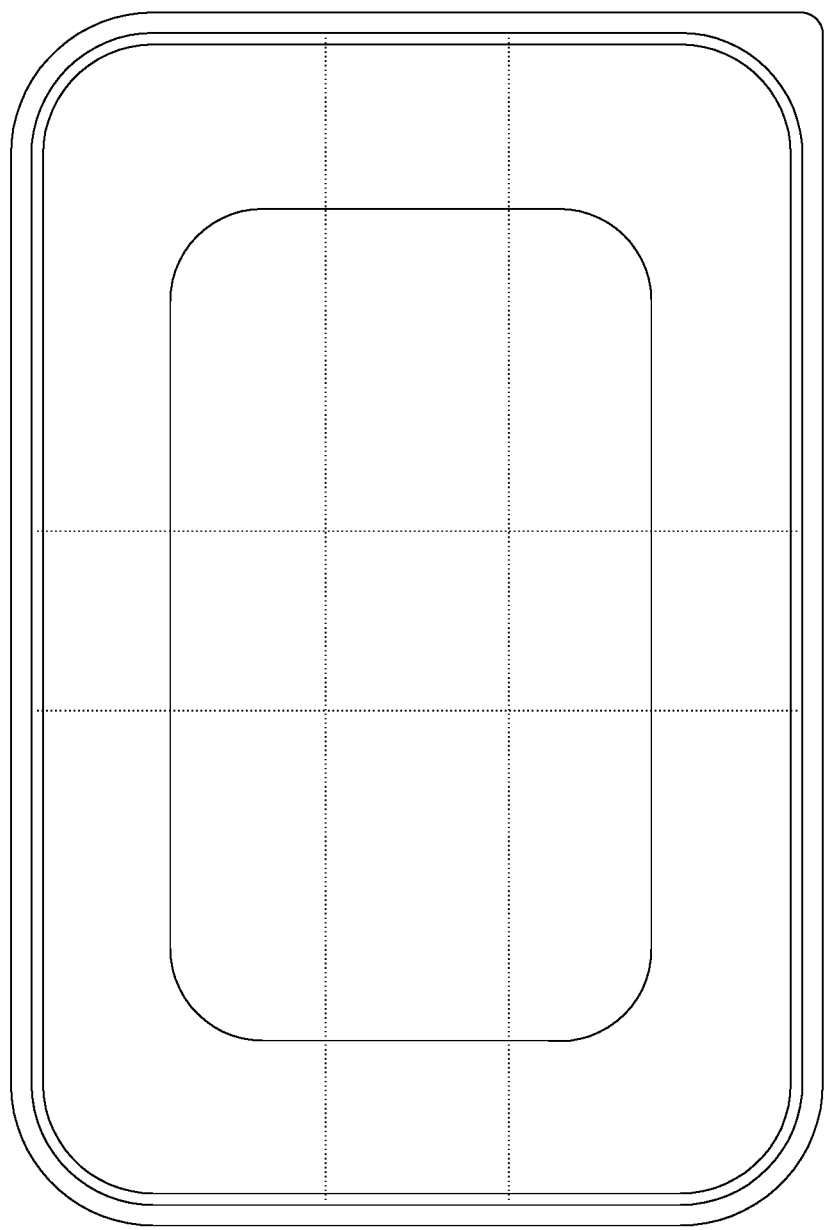

SEALABLE AND PEELABLE POLYESTER FILM

TECHNICAL FIELD

The present invention relates to polyester films and to their use in food packaging operations and to the packages obtained therefrom. The invention also relates to a process for the manufacturing of such polyester films.

BACKGROUND ART

Polyester films are commonly used as lidding films, in particular for ovenable containers. Packaging systems comprising a rigid heat-stable container having a thin flexible thermoplastic film sealed onto it are commonly used for the packaging of so-called "ready-meals", that is food products which only require heating to be ready for consumption. Heating can be carried out in a microwave or in a conventional oven. Due to the temperatures involved in the heating step only few materials can be used for the container, such as aluminium, polyester-coated cardboard or poly(ethylene terephthalate) (PET). Crystalline PET (CPET) containers are especially suitable for this application. To improve the heat-sealability of these containers with the lidding films often the container comprises a layer of amorphous PET (APET) as the food contact layer.

Polyester films are also commonly used as lidding films or bags for moist or respiring products like fruit, vegetables and fresh prepared foods. For example, amorphous PET (APET) containers are lidded with BOPET (biaxially-oriented polyethylene terephthalate) films or bags made with these films. To improve the heat-sealability of the PET lidding film to the container or to itself, a heat-sealable layer of a lower melting material is usually provided on the film. The heat-sealable layer may be coextruded with the PET base layer that is extruded simultaneously through a single die, as described in EP-A-1,529,797 and WO2007/093495. Alternatively, the heat-sealable layer may be solvent- or extrusion-coated over the base layer. Heat-shrinkable polyester films comprising a solvent-based heat-sealable coating are known. For instance, U.S. Pat. No. 2,762,720 discloses a PET film having a shrink of at least 10% at 100° C. in at least one direction provided with a heat-sealable coating of a vinylidene chloride copolymer.

EP-A- 1,252,008 (corresponding to US2004/033382) discloses films comprising a polymer having at least 80% by weight polyethylene terephthalate and a heat-seal coating applied from a solution on at least one surface of the film selected from ethylene/vinyl acetate copolymers, polyethylene terephthalate copolymers and their blends. Said films are heat-shrinkable in the range of 5 to 55%, preferably 10% to 30%, at 100° C.

EP-A-2,178,701 discloses a polyester film comprising a polyester base film that has a shrink in each direction of less than 5% at 100° C. and of at least 5% at 150° C. and at least a heat-sealable coating on at least one surface of the polyester base film. Said film is bi-axially oriented, the orientation being carried on sequentially in the two perpendicular directions.

U.S. Pat. No. 7,144,615 discloses a coextruded, transparent, biaxially oriented polyester film comprising a base layer (B) and a heat-sealable top layer (A) which is peelable with respect to at least CPET, the heat-sealable and peelable top layer (A) consisting of a) 70-97% by weight of polyester and b) 3-20% by weight of a polyester-incompatible polymer or anti-PET polymer based on the mass of the top layer (A) and c) particles.

JPH10315417 describes thermoformable laminated not-oriented materials for containers (moulded articles), such as a laminated polyester sheet containing a core polyester layer and a skin layer. The Applicant has observed that, when sealed at the condition needed to get the required hermeticity, the coated films disclosed in the art do not open cleanly and show tearing when peeled off the trays. On the other end the same coated films, if sealed under milder conditions, provide for packages that are no more airtight even if easily peeled off without tearing.

Nowadays thinner and thinner films are requested by the market for economic and sustainability reasons and it is just when thin films are used that their tearing more often occurs.

At the same time and for the same reasons, thinning is required for the containers, which are also largely made of recycled polyester, such as rPET. The use of rPET and of thinner containers forces the packaging film manufacturers to carefully tailor the shrink properties of the lidding films. Films with a significant shrink at fairly low temperatures, such as 100° C., tend to be unsuitable in lidding applications: the high shrink at temperatures well below the heat-sealing temperature of polyester films (typically from 140° C. to 200° C.) causes an excessive shrink of the film before sealing to the container is complete, thus requiring a significant excess of film in order to successfully form a seal between the film and the rim of the container. It is therefore advantageous to use lidding polyester heat-shrinkable films that have negligible shrink at temperatures below the polyester heat-sealing temperature.

The amount of shrink of the heat-shrinkable film and its shrink tension (maximum and residual values, as explained hereinafter) should in any case be such that the resulting package is not distorted. The need for controlled shrink properties, i.e. shrink and/or shrink tension, is particularly important in the case of films used in the packaging of products which are heat-treated in the package, for instance pasteurized, to avoid distortion or breakage of the package as a consequence of the heat-treatment. Furthermore, it is to be noted that an ideal packaging film should ensure good hermeticity and clean peelability and good antifog performance in order to provide packages with a satisfactory functionality in addition to an appealing appearance and that functionality should be preserved under the most common packaging and storage conditions and over time for the entire package life.

SUMMARY OF THE INVENTION

Concerning the problem of openability of packages and in particular the tearing of the lid when peeled off polyester-based trays, the Applicant surprisingly found out that an oriented polyester film having certain tear initiation force values, in particular certain tear ratios values, when coated with a specific seal coating composition is able to provide good hermeticity and peelability when applied to polyester-based or aluminium containers, with no tearing when peeled off said trays. This feature is really appreciated by packers and final consumers.

Furthermore, it was found that the film of the present invention starts sealing at a very low sealing temperature. This is another appreciated feature, considering that lighter and lighter and less resistant trays are being introduced in the market. For such trays, lower sealing temperatures minimise distortion after packaging and/or heat treatment step(s).

The film of the present invention gives good hermeticity, and clean peelability with no tearing when sealed onto APET, CPET and aluminium containers The films of the present invention are suitable for Ready Meals applications, i.e. when thermal treatments are involved; such films in fact could withstand pasteurization step at 98° C. for 2 h and perform well in both microwave and conventional ovens. After these harsh heat-treatments, a clean peelability is remarkably maintained.

A first object of the present invention is therefore a bi-axially oriented coated polyester film comprising a polyester base film and a heat sealable coating wherein said heat sealable coating comprises one or more amorphous copolyester(s) comprising units of terephthalic acid, naphthalene dicarboxylic acid and at least a diol, and wherein the heat-sealable coating contains from 20 to 50% by weight of terephthalic acid units and from 5 to 25% by weight of naphthalene dicarboxylic acid units, said bi-axially oriented coated polyester film having a tear ratio, between the tear initiation force measured according to ASTM D-1004 and the coated film total thickness, of at least 37 gf/micron in at least one of longitudinal and transverse direction.

A second object of the present invention is a process for the manufacture of a film according to the first object of the present invention.

A third object of the present invention is a package comprising a container, a product and a lid made of the bi-axially oriented coated polyester film according to the first object of the present invention sealed onto said container.

A fourth object of the present invention is a bag or multi-compartment tray-less package with a rigid frame made of the bi-axially oriented coated polyester film according to the first object of the present invention sealed onto itself.

A fifth object of the present invention is the use of the bi-axially oriented coated polyester film according to the first object of the present invention for packaging food, preferably for cooking applications, such as ready meals, or for packaging moist or respiring products.

DEFINITIONS

The term "polyester" is used herein to refer to both homo-and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly (ethylene terephthalate) (PET). Preference is given to polyesters that contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, in particular succinic acid, sebacic acid, adipic acid, azelaic acid, suberic acid or pimelic acid. Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the polyester base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous co-polyesters include co-polyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65.

The phrase "polyester film" or "polyester base film" as used herein relates to films comprising at least 70%, 80%, 90% by weight of the film of one or more (co)polyesters.

The phrase "ethylene- alpha -olefin copolymer" as used herein, refers to heterogeneous and to homogeneous polymers such as linear low density polyethylene (LLDPE) with a density usually in the range of from about 0.900 g/cm$^3$ to about 0.930 g/cm$^3$, linear medium density polyethylene (LMDPE) with a density usually in the range of from about 0.930 g/cm$^3$ to about 0.945 g/cm$^3$, and very low and ultra low density polyethylene (VLDPE and ULDPE) with a density lower than about 0.915 g/cm$^3$, typically in the range 0.868 to 0.915 g/cm$^3$, and such as Maleic Anhydride-Modified Ethylene/Butene Copolymer BYNEL™ resins obtainable from DuPont, metallocene-catalyzed EXACT™ and EXCEED™ homogeneous resins obtainable from Exxon, single-site AFFINITY™ resins obtainable from Dow, and TAFMER™ homogeneous ethylene- alpha-olefin copolymer resins obtainable from Mitsui. All these materials generally include co-polymers of ethylene with one or more co-monomers selected from ($C_4$-$C_{10}$)- alpha -olefin such as butene-1, hexene-1, octene-1, etc., in which the molecules of the copolymers comprise long chains with relatively few side chain branches or cross-linked structures. As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "polymers which are incompatible with polyesters (also named anti-PET polymers)", refers to homo and copolymers based on ethylene (e.g. LLDPE, HDPE), propylene (PP), cycloolefins (CO), amides (PA) or styrene (PS) units. Suitable incompatible polymers (anti-PET) may be copolymers such as copolymers based on ethylene ($C_2/C_3$, $C_2/C_3C_4$ copolymers), propylene $C_2/C_3$, $C_2/C_3C_4$ copolymers), butylene ($C_2/C_3$, $C_2/C_3C_4$ copolymers) or based on cycloolefins (norbornene/ethylene, tetracyclodecene/ethylene copolymers).

As used herein the term "peelable seal" refers to a seal which is strong enough to guarantee the hermeticity of the package during its life-cycle but which can be easily opened by hand with separation of the two materials that were joined by the seal, without tearing.

As used therein, the term "heat-sealable coating" refers to a heat-sealable layer that has not been coextruded with the layer(s) making up the polyester base film.

As used herein, the phrases "corona treatment" and "corona discharge treatment" refer to subjecting the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

As used herein the term "polyamide" refers to high molecular weight polymers having amide linkages along the molecular chain, and refers more specifically to synthetic polyamides such as nylons. Such term encompasses both homo-polyamides and co-(or ter-) polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions which are typical of polyamides, i.e. amino and acid groups, such monomers being typically lactams or aminoacids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof. Said term also includes crystalline or partially crystalline, aromatic or partially aromatic polyamides.

As used herein, the phrase "amorphous polyamide" refers to polyamides or nylons with an absence of a regular three-dimensional arrangement of molecules or subunits of molecules extending over distances, which are large relative to atomic dimensions. However, regularity of structure exists on a local scale. See, "Amorphous Polymers," in Encyclopedia of Polymer Science and Engineering, 2nd Ed., pp. 789-842 (J. Wiley & Sons, Inc. 1985). This document has a Library of Congress Catalogue Card Number of 84-19713. In particular, the term "amorphous polyamide" refers to a material recognized by one skilled in the art of differential scanning calorimetry (DSC) as having no measurable melting point (less than 0.5 cal/g) or no heat of fusion as measured by DSC using ASTM 3417-83. Such nylons include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, the phrases "longitudinal direction" and "machine direction", herein abbreviated "LD" or "MD", refer to a direction "along the length" of the film, i.e., in the direction of the film as the film is formed during coextrusion.

As used herein, the phrase "transverse direction" or "crosswise direction", herein abbreviated "TD", refers to a direction across the film, perpendicular to the machine or longitudinal direction.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state. The solid-state orientation may be mono-axial, transverse or, preferably, longitudinal, or, preferably, bi-axial.

As used herein, the phrases "orientation ratio" and "stretching ratio" refer to the multiplication product of the extent to which the plastic film material is expanded in the two directions perpendicular to one another, i.e. the machine direction and the transverse direction. Thus, if a film has been oriented to three times its original size in the longitudinal direction (3:1) and three times its original size in the transverse direction (3:1), then the overall film has an orientation ratio of 3×3 or 9:1.

As used herein, "a multi-compartment tray-less package with a rigid frame" refers to the package described in EP2765092.

In the present context, Tear Initiation force has been evaluated and has the meaning according to ASTM D1004.

As used herein, the phrase "respiring product(s)" refer to products such as fruits and vegetables which use up oxygen and produce water vapor, carbon dioxide and ethylene because they continue to respire after harvesting; or such as cheeses that ripen during packaging and use oxygen and produce carbon dioxide.

DESCRIPTION OF DRAWINGS

FIG. 1 shows a package from whom four specimens are cut off in order to measure the seal strength according to the test method described in the experimental part.

DETAILED DESCRIPTION OF INVENTION

A first object of the present invention is therefore a bi-axially oriented coated polyester film comprising a polyester base film and a heat sealable coating wherein said heat sealable coating comprises one or more amorphous copolyester(s) comprising units of terephthalic acid, naphthalene dicarboxylic acid and at least a diol, and wherein the heat-sealable coating contains from 20 to 50% by weight of terephthalic acid units and from 5 to 25% by weight of naphthalene dicarboxylic acid units, said bi-axially oriented coated polyester film having a tear ratio, between the tear initiation force measured according to ASTM D-1004 and the coated film total thickness, of at least 37 gf/micron in at least one of longitudinal and transverse directions.

Preferably, the tear ratio of the coated polyester film is at least 39 gf/micron, more preferably at least 40 gf/micron, even more preferably at least 41 gf/micron, still more preferably at least 43 gf/micron or 46 gf/micron in at least one of longitudinal and transverse directions.

Preferably, the tear ratio of the coated polyester film is at least 39 gf/micron, more preferably at least 40 gf/micron, even more preferably at least 41 gf/micron, still more preferably at least 43 gf/micron or 46 gf/micron in both LD and TD.

The coated polyester films according to the present invention are heat sealable and peelable with respect to at least CPET, APET or aluminium containers.

The polyester base film may have any desired number of layers, typically from 1 to 10 layers, from 1 to 8 layers, from 1 to 5 layers, from 1 to 3 layers.

The polyester base film is characterized by a tear ratio, between the tear initiation force measured according to ASTM D-1004 and the base film total thickness, preferably of at least 37 gf/micron, preferably at least 39 gf/micron, more preferably at least 40 gf/micron, even more preferably at least 41 gf/micron, still more preferably at least 43 gf/micron or 46 gf/micron in at least one of longitudinal and transverse directions.

The polyester base film is characterized by a tear ratio, between the tear initiation force measured according to ASTM D-1004 and the base film total thickness, preferably of at least 37 gf/micron, preferably at least 39 gf/micron, more preferably at least 40 gf/micron, even more preferably at least 41 gf/micron, still more preferably at least 43 gf/micron or 46 gf/micron in both LD and TD directions. Examples of these films and their preparation are disclosed in EP2714390.

The skilled in the art is able to manufacture the present polyester base films according to the present description and to calculate the tear ratio as explained in the experimental part.

The total thickness of the polyester base film may vary within wide limits. It is preferably from 3 to 100 micron, in particular from 5 to 80 micron, preferably from 8 to 70 micron, even more preferably from 15 to 50 micron. In the most preferred embodiments, the total thickness of the polyester base film is lower than 35, than 30, than 25 or than 20 micron.

The total thickness of the polyester base film preferably is at least 5 or at least 10 or at least 15 micron. The total thickness of the polyester base film preferably is at most 100 or at most 80 or at most 70 or at most 50 or at most 40 or at most 35 or at most 30 or at most 25 or at most 20 micron.

The thickness of the polyester base film is preferably at least 60% 70%, 80%, 90%, 95 or 97% of the total thickness of the coated film.

The total thickness of the coated film may vary within wide limits. It is preferably from 3.2 to 105 micron, in particular from 5 to 85 micron, preferably from 8 to 75 micron, even more preferably from 15 to 55 micron.

In the most preferred embodiments, the total thickness of the coated film is lower than 80 or lower than 70 or lower than 50 or lower than 40 or lower than 30 or lower than 25 or lower than 20 micron.

The total thickness of the coated film preferably is at least 5 or at least 10 or at least 15 micron. The polyester base film comprises at least 40%, 45%, 50%, 55%, 60%, 70%, 80%, 90% of the overall weight of the film of one or more (co)polyesters, preferably at least 50%, more preferably at least 70%, even more preferably at least 80%, 90%, 95%.

In a first embodiment of the biaxially-oriented coated polyester film of the present invention, the polyester base film has only one layer.

The monolayer polyester base film may comprise any suitable homo- and/or co-polyester resin. Preferably, the polyester base film comprises at least 40 wt.%, 45%, 50%, 55%, 60%, 70%, 80% of poly(ethylene terephthalate).

Preferably, the poly(ethylene terephthalate) has an intrinsic viscosity (IV) of at least 0.75, or 0.76, 0.77, 0.78, 0.79, even more preferably it has an IV of at least 0.80. An example of such a polymer is PET 9921W® sold by Voridian a poly(ethylene terephthalate) polymer with a melting point $T_m$ of 245° C. and an IV of 0.80. As used therein, intrinsic viscosity (IV) is defined as the limiting value of the reduced viscosity at infinite dilution of the polymer and is determined using a capillary viscometer. Suitable methods for the determination of the intrinsic viscosity are for instance ASTM method D4603-03 and Voridian's internal method VGAS-A-AN-G-V-1.

Suitable resins are EASTAPAK COPOLYESTER 9921 by Eastman Chemical and RAMAPET N180 by Indorama.

Mixtures or blends of any homo- and/or co-polyester can be used for the monolayer polyester base film wherein poly(ethylene terephthalate) represents 40%, 45%, 50%, 55%, 60%, 70%, 80% by weight of the polyester base film. Preferably the polyester base film comprises at least 40%, 45%, 50%, 55%, 60%, 70%, 80% by weight of poly(ethylene terephthalate) having an IV of at least 0.75, even more preferably of at least 0.80.

Any homo- and/or co-polyester can be blended with poly(ethylene terephthalate). For instance the polyester base film may comprise at least 40%, 45%, 50%, 55%, 60%, 70%, 80% by weight of poly(ethylene terephthalate) and not more than 60%, 55%, 50%, 45%, 40%, 30%, 20% by weight of an amorphous polyester resin. Suitable amorphous polyester resins are co-polyesters of terephthalic acid with an aliphatic diol and a cycloaliphatic diol, especially ethylene glycol and 1,4-cyclohexanedimethanol, like PETG Eastar® 6763 sold by Eastman, which comprises a copolyester of terephthalic acid, about 33 mole % 1,4-cyclohexane dimethanol and about 67 mole % ethylene glycol and which has a glass transition temperature $T_g$ of 81° C. GN001 by Eastman Chemical can also be used (Density 1.27 g/cm3, Glass Transition 81° C., Viscosity Solution 0.75 mPa·sec). Preferred polyester base films comprise at least 40%, 45%, 50%, 55%, 60%, 70%, 80% by weight of the poly(ethylene terephthalate) preferably having an IV of at least 0.75 and not more than 60%, 55%, 50%, 45%, 40%, 30%, 20% by weight of an amorphous polyester of terephthalic acid with ethylene glycol. For instance, the polyester base film may comprise from 45% to 100%, 50% to 80% by weight of poly(ethylene terephthalate) preferably having an IV of at least 0.75 and 0% to 55, 20% to 50% by weight of an amorphous polyester of terephthalic acid with ethylene glycol and 1,4-cyclohexanedimethanol.

In one embodiment, the polyester base film only comprise an amorphous polyester resins, preferably a copolyester of terephthalic acid with ethylene glycol, and does not comprise poly(ethylene terephthalate).

Preferably, the polyester base film comprises, in addition to polyester resins, 3 to 40% by weight, preferably 10 to 25% by weight of a thermoplastic resin selected among: ethylene-alpha-olefin copolymers, polyamides, polystyrenes, in particular styrene-butadiene block copolymers, ionomers, ethylene/unsaturated carboxylic acid copolymers, such as ethylene/(meth)acrylic acid copolymers, ethylene/unsaturated esters copolymers, such as ethylene/vinyl acetate copolymers, ethylene/propylene copolymers and ethylene/cyclic olefin copolymers, such as ethylene/norbornene copolymers. Ethylene/(meth)acrylic acid copolymers and ethylene-alpha-olefin copolymers are preferred.

Preferably, the polyester base film comprises an LLDPE, even more preferably a modified LLDPE. In the most preferred embodiment, the content of the modified LLDPE ranges between 12 and 20% by weight based on the total weight of the base layer.

Suitable resin is BYNEL 4104 (2006) by DuPont.

In a second embodiment of the biaxially-oriented coated polyester film of the present invention, the polyester base film has more than one layer. The multilayer polyester base film may have 2, 3, 4, 5, 6 or even a greater number of layers. The polyester base film preferably has 2 to 5 layers, even more preferably 2 to 3 layers. Preferably, the layers of the polyester base film are coextruded, that is extruded simultaneously from a single die. Poly(ethylene terephthalate) may be present in one, in more than one or in all of the layers of the polyester base film. The layers of the polyester base film may have the same or different compositions with at least 40%, 45%, 50%, 55%, 60%, 70%, 80% of the overall weight of the polyester base film being made of poly(ethylene terephthalate). Preferably, the poly(ethylene terephthalate) has an IV of at least 0.75. Even more preferably, the poly(ethylene terephthalate) has an IV of at least 0.80.

The film may comprise a first layer comprising poly(ethylene terephthalate) and an additional layer. The additional layer may comprise any suitable thermoplastic resin, although a polyester resin is preferred. The polyester resin may be the same as the resin of the first layer or different. The thickness of the additional layer is generally between about 5 and 40% of the thickness of the first layer. The additional layer may have a thickness of up to about 25 micron, preferably up to about 15 micron, more preferably between about 0.5 and 10 micron, and more preferably between about 0.5 and 7 micron.

A suitable two-layer film comprises a first layer comprising a blend of poly(ethylene terephthalate) and an amorphous polyester and an additional layer comprising the same amorphous polyester resin as the base layer. For instance, the first layer may comprise a blend of 45% to 100%, 50% to 80% by weight of poly(ethylene terephthalate) and 0% to 55%, 20% to 50% by weight of an amorphous polyester. The thickness of the layers is such that the amount by weight of poly(ethylene terephthalate) is at least 40%, 45%, 50%, 55%, 60%, 70%, 80% of the overall weight of the film. Preferably, the poly(ethylene terephthalate) has an IV of at least 0.75. Even more preferably, the poly(ethylene terephthalate) has an IV of at least 0.80.

A particularly suitable two layer film comprises a first layer, comprising 45% to 100%, 50% to 80% by weight of poly(ethylene terephthalate) preferably having an IV of at least 0.75 and 0% to 55%, 20% to 50% by weight of an amorphous polyester of terephthalic acid with ethylene glycol and 1,4-cyclohexanedimethanol, and an additional layer comprising the same amorphous polyester as the first layer.

Preferably, a suitable two-layer film comprises a first layer comprising an ethylene-alpha-olefin copolymer, more preferably an LLDPE, even more preferably a modified LLDPE in the range 12 and 20% by weight based on the total weight of the base layer.

Suitable resin is BYNEL 4104 (2006) by DuPont.

The polyester base film may have a three-layer structure. Various combinations of layers can be used. In a preferred configuration, the polyester base film comprises a core layer comprising poly(ethylene terephthalate) and first and second outer layers on both sides of the core layer.

For instance, the three-layer film may comprise the core layer, a first and a second outer layer having the same composition and comprising a polyester resin different from the resin used in the core layer. Alternatively, the three-layer film may comprise the core layer comprising poly(ethylene terephthalate), a first outer layer and a second outer layer comprising the same polyester resin as the core layer. A suitable three-layer film may comprise a core layer comprising at least 40%, 45%, 50%, 55%, 60%, 70%, 80% of poly(ethylene terephthalate) and not more than 60%, 55%, 50%, 45%, 40%, 30%, 20% of an amorphous polyester, a first outer layer comprising an amorphous polyester and a second outer layer comprising the same poly(ethylene terephthalate) as the core layer. Preferably, the amorphous polyester in the core layer is the same as the amorphous polyester in the first outer layer. Preferably, the poly(ethylene terephthalate) has an IV of at least 0.75. Even more preferably, the poly(ethylene terephthalate) has an IV of at least 0.80.

Alternatively, the three-layer film may comprise a core layer comprising a blend of poly(ethylene terephthalate) and of an amorphous polyester and a first and a second outer layers comprising an amorphous polyester. Preferably, the amorphous polyester in the core layer is the same as the amorphous polyester in the outer layers. A suitable amorphous polyester is for instance a copolymer of terephthalic acid with ethylene glycol and 1,4-cyclohexanedimethanol.

Preferably, a suitable three-layer film comprises a first outer layer comprising an ethylene-alpha-olefin copolymer, more preferably an LLDPE, even more preferably a modified LLDPE in the range 12 and 20% by weight based on the total weight of the base layer. Suitable resin is BYNEL 4104 (2006) by DuPont.

The thickness of the layers is such that the amount by weight of poly(ethylene terephthalate) is at least 40%, 45%, 50%, 55%, 60%, 70%, 80% of the overall weight of the film. Preferably, the poly(ethylene terephthalate) has an IV of at least 0.75. Even more preferably, the poly(ethylene terephthalate) has an IV of at least 0.80.

In general, the thickness of each outer layer is between about 5 and 40% of the thickness of the core layer. Each outer layer may have a thickness of up to about 25 micron, preferably up to about 15 micron, more preferably between about 0.5 and 10 micron, and even more preferably between about 0.5 and 7 micron. The thickness of the two outer layers may be the same or different.

One or more of the layers of the film of the present invention may contain any of the additives conventionally employed in the manufacture of polymeric films. Thus, agents such as pigments, lubricants, anti-oxidants, radical scavengers, UV absorbers, thermal stabilisers, anti-blocking agents, surface-active agents, slip aids, optical brighteners, gloss improvers, viscosity modifiers may be incorporated as appropriate.

In particular, to improve the processing of the film in high speed packaging equipment, slip and/or anti-blocking agents may be added to one or both of the surface layers. The additives may be added in the form of a concentrate in a polyester carrier resin. The amount of additive is typically in the order of 0.2 to 5% by weight of the total weight of the layer.

The polyester film of the present invention further comprises a heat-sealable coating applied on at least one surface of the polyester base film. According to the Glossary of Packaging Terms of the Flexible Packaging Association a heat-sealable coating is an "adhesive coating applied to a packaging material that is capable of being activated by heat, pressure and dwell time to form a bond. The coating may be applied as a hot melt, from a solvent solution or from a water emulsion".

In the present invention, the heat-sealable coating is preferably applied only onto one surface of the polyester base film. The heat-sealable coating of the film of the present invention may be applied either from a melt or, preferably, from a solution. The heat-sealable coating is typically applied from a solution comprising from 5% to 50%, from 15% to 50%, from 20% to 40% by weight of solid polymer(s) in the appropriate solvent, generally an organic solvent.

In the present invention, the heat-sealable dried coating comprises at least 70%, 80%, 90%, 95% by weight of one or more amorphous copolyester(s). Suitable amorphous copolyester(s) comprise units of terephthalic acid and naphthalene dicarboxylic acid and at least a diol. More preferably, said amorphous copolyester(s) comprise units of terephthalic acid, naphthalene dicarboxylic acid and neopentyl glycol, diethylene glycol and ethylene glycol. The heat-sealable coating contains from 20 to 50% by weight of terephthalic acid units, from 5 to 25% by weight of naphthalene dicarboxylic acid units, the remaining part being the one or more diols (glycols) listed above. Preferred diols are neopentyl glycol, diethylene glycol and ethylene glycol.

Preferably, the heat-sealable coating according to the invention contains from 30 to 40% by weight of terephthalic acid units.

Preferably, the heat-sealable coating according to the invention contains from 10 to 20% by weight of naphthalene dicarboxylic acid units.

In a preferred embodiment, the heat-sealable coating contains from 20 to 50% or from 30 to 40% by weight of terephthalic acid units, from 5 to 25% or from 10 to 20% by weight of naphthalene dicarboxylic acid units, from 10 to 25% by weight of neopentyl glycol, from 10 to 25% by weight of diethylene glycol and from 10 to 25% by weight of ethylene glycol.

In a preferred embodiment, the heat-sealable coating consists of from 20 to 50% or from 30 to 40% by weight of terephthalic acid units, from 5 to 25% or from 10 to 20% by weight of naphthalene dicarboxylic acid units, from 10 to 25% by weight of neopentyl glycol, from 10 to 25% by weight of diethylene glycol, from 10 to 25% by weight of ethylene glycol and, optionally, an antifog agent. In a preferred embodiment, the heat-sealable coating contains from 30 to 40% by weight of terephthalic acid units, from 13 to 19% by weight of naphthalene dicarboxylic acid units, from 15 to 21% by weight of neopentyl glycol, from 11 to 17% by weight of diethylene glycol and from 14 to 20% by weight of ethylene glycol.

In a preferred embodiment, the heat-sealable coating consists of from 30 to 40% by weight of terephthalic acid units, from 13 to 19% by weight of naphthalene dicarboxylic acid units, from 15 to 21% by weight of neopentyl glycol, from 11 to 17% by weight of diethylene glycol, from 14 to 20% by weight of ethylene glycol and, optionally, an antifog agent.

In a preferred embodiment, the heat-sealable coating consists of from 30 to 40% by weight of terephthalic acid units, from 13 to 19% by weight of naphthalene dicarboxylic acid units, from 15 to 21% by weight of neopentyl glycol, from 14 to 20% by weight of diethylene glycol, from 11 to 17% by weight of ethylene glycol and, optionally, an antifog agent.

Such units belong to the same or different copolyesters.

The heat- sealable coating of the present films comprises less than 5%, 3%, 1% of polymers which are incompatible with polyester (anti-PET polymer), as previously defined.

Preferably, the heat- sealable coating does not comprise any anti-PET polymer.

In the preferred embodiments, the heat sealable coating advantageously comprises antifog agents as listed hereinafter.

A suitable coating for the present heat-sealable coating is, for instance, the composition sold by Akzo Nobel under the trade name Therm-Flex 5908 (also marketed as Hold-Flex 5908), which in addition comprises ad antifog agent (ditri-decyl-sulfosuccinate).

Preferably the heat sealable coating suitable for the films of the present invention show a glass transition temperature Tg, measured by Differential Scanning calorimeter according to ASTM E-1356, as herein described, higher than 10° C., than 15° C. or more preferably higher than 20° C. Preferably, the Tg of the heat sealable coating is lower than 70° C., than 50° C., than 35° C. or more preferably lower than 25° C. measured according to the same method.

Preferably, the Tg of the heat sealable coating is in the range from 10 to 70° C., more preferably 15 to 50° C., even more preferably from 20 to 35° C., from 20° C. to 30° C., most preferably from 20 to 25° C. measured according to the same method.

Preferably, the coating layer is applied to the polyester base film at a dry coat weight (grammage) higher than 0.8 g/m² or than 1.0 g/m² or than 1.5 g/m².

Preferably, the grammage of the coating layer is in the range from 0.5 to 6.0 g/m², more preferably 0.8 to 5.0 g/m², particularly 1.0 to 3.0 g/m², most preferably 1 to 2 g/m²

The thickness of the dry coating layer is preferably in the range from 0.2 to 5.0 micron, more preferably 0.25 to 3.0 micron, and particularly 0.3 to 2.0 micron.

The heat-shrinkable film of the present invention can have no or negligible free shrink at temperatures up to 140° C. The free shrink (in each direction) can be less than 5% at temperatures up to 100° C., up to 120° C., even up to 140° C. and the free shrink (in each direction) can be at least 3% at 160° C. Usually the free shrink (in each direction) does not exceed 20% over the common heat-sealing temperatures of polyester films, namely in the range of from 100° C. to 200° C., or from 140 to 200° C. The shrink generally does not exceed 20% (in each direction) at 150° C., at 160° C., and even at 180° C. The shrink properties of the films according to the invention can also be tailored for applications where higher free shrink values/shrink tensions are needed, for examples when the films are intended to be used for the manufacturing of bags or where the containers used are able to withstand higher free shrink values and forces. In such cases, the free shrink (in each direction) can be at least 5% at 140° C., preferably at least 10% but the shrink generally does not exceed 30% (in each direction) at 150° C., at 160° C., and even at 180° C.

In particular when used for bags, the films according to the present invention can have higher free shrink values, namely a free shrink higher than 10% at 100° C., preferably higher than 15%, even more preferably higher than 20%, still more preferably higher than 25% in longitudinal and/or transverse directions. Such a free shrink can be obtained by the skilled in the art by avoiding the annealing step or reducing its temperature and times.

The maximum value of the shrink tension of the film of the invention is typically not less than 5 kg/cm$^2$, 8 kg/cm$^2$ or even 10 kg/cm$^2$ in at least one direction.

The maximum value of the shrink tension of the films does not exceed 60 kg/cm$^2$, 50 kg/cm$^2$, 40 kg/cm$^2$, 30 kg/cm$^2$ in each direction.

Usually the films of the invention have the following combination of free shrink/shrink tension properties in each direction: a shrink of less than 5% at 100° C. and of at least 3% at 150° C. and a shrink tension not exceeding 60 kg/cm$^2$. Preferably, the films of the invention have a shrink in each direction of less than 5% at 100° C. and of at least 3% but not more than 20% at 150° C. and a shrink tension not exceeding 60 kg/cm$^2$ in each direction. Even more preferably, the films of the invention have a shrink in each direction of less than 5% at 100° C. and of at least 3% but not more than 20% at 150° C. and a shrink tension not exceeding 50 kg/cm$^2$ in each direction.

The film of the present invention is further preferably characterised by residual shrink tensions values at 5° C. (see test method described hereinafter) in longitudinal and in transverse directions of at least 250 g/cm$^2$ and/or not more than 700 g/cm$^2$, preferably between 300 and 550 g/cm$^2$, even more preferably between 300 and 450 g//cm$^2$ in combination with anyone of the embodiments described above for the free shrink and the shrink tensions properties.

The film of the present invention preferably comprises at least one surface provided with anti-fogging properties. Typically, the anti-fogging surface is the surface of the heat-sealable coating that is the surface directly facing the product in the container.

To obtain an anti-fogging surface, anti-fogging agents may be added directly into the heat-sealable coating composition. The amount of anti-fogging agent added to the heat-sealable coating is generally from 0.5 to 15%, from 1 to 10%, from 1 to 5% by weight based on the dry coat weight of the coating. Preferably, the heat-sealable coating of the film of the present invention contains an anti-fogging additive.

Alternatively, the anti-fogging agent may be in the form of a coating applied on the heat-sealable coating. Conventional techniques can be used for the application of the anti-fogging agent to the film of the invention, like gravure coating, reverse kiss coating, fountain bar coating, spraying. The amount of the anti-fogging agent coating is not particularly limited, but it may be 0.1 to 8 mL/m$^2$, 0.5 to 7 mL/m$^2$, 0.5 to 5 mL/m$^2$.

Suitable anti-fogging agents are non-ionic surfactants like polyhydric alcohol fatty acid esters, higher fatty acid amines, higher fatty acid amides, polyoxyethylene ethers of higher fatty alcohols, and ethylene oxide adducts of higher fatty acid amines or amides. Among these, preferred are polyhydric alcohol fatty acid esters, polyoxyethylene ethers of higher fatty alcohols and glycerine fatty acid esters. Alkyl sulfosuccinate family additives are particularly suitable for the film according to the present invention, especially ditridecyl-sulfosuccinate.

A second object of the present invention is a process for the manufacture of a film according to the first object of the present invention, which process comprises:

i) providing a monoaxially or biaxially oriented polyester base film having a tear ratio, between the tear initiation force measured according to ASTM D-1004 and the base film total thickness, of at least 37 gf/micron in at least one of longitudinal or transverse directions, ii) coating the monoaxially or biaxially oriented polyester base film by applying a heat sealable coating comprising one or more amorphous copolyester(s) comprising units of terephthalic acid, naphthalene dicarboxylic acid and at least a diol, wherein the heat-sealable coating contains from 20 to 50% by weight of terephthalic acid units and from 5 to 25% by weight of naphthalene dicarboxylic acid units to at least one surface of the polyester base film, thus providing a mono or biaxially oriented coated polyester film, iii) in case a monoaxially oriented coated film is obtained, orienting the monoaxially oriented coated film in the other one of LD or TD direction, thus providing a biaxially oriented coated polyester film, and iv) drying the biaxially oriented coated polyester film.

The present process may further optionally comprise v) annealing the biaxially oriented polyester base film, before or after coating, and/or vi) subjecting the biaxially oriented polyester base film to a chemical or physical surface-modifying treatment before coating to improve the adhesion between the heat sealable coating and the film.

The biaxially oriented polyester base film may be manufactured according to the following steps a) co-extrusion of the film resins through a flat die, b) sequential or simultaneous bi-axial orientation of the obtained cast sheet, at an orientation ratio in the longitudinal direction higher than 2:1, preferably higher than 3:1 and at an orientation ratio in the cross-wise direction higher than 2:1, preferably higher than 3:1;

c) optionally annealing or heat-setting the oriented films respectively at temperatures of from 70 to 100 ° C. or from 130 to 210° C.;

d) cooling the film at a temperature in the range of 10 to 40° C.

The polyester base film can be manufactured according to conventional technique, for instance as described in EP2714390.

a) The manufacture of the present polyester base film involves feeding the extruders with the solid polymer or polymer blend beads for the various layers, melting the polymer beads in the extruders and then forward the molten resins of the layers into a flat extrusion die where they are combined to give the desired sequence. The obtained tape, that is preferably from about 0.1 mm to about 2 mm thick, is then cooled, for instance by means of a chill roll, typically with the aid of an air knife.

The cooled sheet is then optionally fed through an irradiation unit, typically comprising an irradiation vault surrounded by a shielding. The flat sheet may in fact be irradiated with high-energy electrons (i.e., ionizing radiation) from an iron core transformer accelerator. Irradiation is carried out to induce cross-linking. The flat sheet is preferably guided through the irradiation vault on rolls. It is thus possible by suitably combining the number of rolls and the path of the traveling web within the irradiation unit to get more than one exposure of the sheet to the ionizing radiation. In one embodiment, the sheet is irradiated to a level of from about 10 to about 200 kGy, preferably of from about 15 to about 150 kGy, and more preferably of from about 20 to about 120 kGy, wherein the most preferred amount of radiation is dependent upon the polymers employed and the film end use. While irradiation is preferably carried out on the extruded cast sheet just before orientation, as described above, it could also be carried out, alternatively or additionally, during or after orientation.

b) Orientation can be done by a simultaneous or sequential tenter apparatus, preferably a simultaneous tenter apparatus.

In the simultaneous process, the optionally irradiated tape is then fed to the pre-heating zone of a simultaneous tenter apparatus, with or without a prior passage through an IR heated oven. The temperature of the oven in said pre-heating zone, the length thereof and the time spent by the traveling web in said zone (i.e. the web speed) can suitably be varied in order to bring the sheet up to the desired temperature for bi-axial orientation. In a preferred embodiment, the orientation temperature is comprised between about 90° C. and about 140° C. and the temperature of the pre-heating zone is kept between about 90° C. and about 150° C. In said pre-heating zone, the sheet is clipped but it is not yet stretched. Thereafter, the resulting hot, optionally irradiated, and clipped sheet is directed to the stretching zone of the simultaneous tenter. Any simultaneous stretching means can be used in said zone. Preferably, however the clips are propelled throughout the opposed loops of the tenter frame by means of a linear synchronous motor. A suitable line for simultaneous stretching with linear motor technology has been designed by Bruckner GmbH and advertised as LISIM® line.

An alternative line for simultaneous stretching of the extruded flat tape is the Andritz MESIM® line, a mechanical system based on a pantograph, equipped with two separated monorails on each side of the orientation unit which determines—by diverging—the pantograph opening. Simultaneous Tenterframe technologies such as the "fixed pantograph" and the "spindle" technologies may also be used.

The configuration of the tenter can be varied depending on the stretching ratios desired. The stretching ratios that are applied in the process according to the present invention are generally comprised between about 2:1 and about 5:1 for MD stretching and between about 2:1 and about 5:1 for TD stretching. Preferably, however stretching ratios higher than 2.5:1 in both directions are applied, wherein stretching ratios higher than 3:1 in both directions are more preferred. The temperature in the stretching zone is kept close to the selected orientation temperature T.

The stretched film is then transferred in a zone that, depending on whether a heat-shrinkable or non heat-shrinkable film is desired, may be a relaxation/annealing or heat-setting zone, heated to a temperature of about 70-100° C. or 130-210° C. respectively.

In the sequential orientation process, the optionally irradiated tape is firstly oriented in one direction, usually the longitudinal direction, i.e. the forward direction through the film stretching machine, and then in the transverse direction. Longitudinal stretching of the extrudate is conveniently carried out over a set of rotating rolls (MDO), which rotate at different speeds. At least one of the first pairs of rolls is heated, for example by inner circulation of hot oil. Transverse stretching is usually carried out in a tenter apparatus (TDO), which comprises a certain number of heating zones and suitable stretching means.

To produce the multilayer heat-shrinkable film of the invention the polymers for the base layer, for the heat-sealable outer layer and, where appropriate, for the second outer layer are fed to separate extruders. The melts are extruded through a multilayer T-die and quenched over a chill roll. Longitudinal stretching (MDO) of the extrudate is conveniently carried out at a temperature range from 60 to 120° C., preferably 70 to 100° C.

In the transverse stretching (TDO), the temperatures of the film are in the range from 90° C. (preheating zone) to 130° C. (stretching zone), preferably 90° C. (preheating zone) to 110° C. (stretching zone). The longitudinal stretching ratio is in the range from 2.0:1 to 5.0:1, preferably from 2.3:1 to 4.8:1. The transverse stretching ratio is generally in the range from 2.4:1 to 5.0:1, preferably from 2.6:1 to 4.5:1. Annealing or heat-setting is carried out at a temperature of from 70 to 100° C. or from 130 to 210° C., the temperature depending on the desired shrink.

Following the annealing or heat-setting step, the film is transferred to a cooling zone where generally air, either cooled or kept at the ambient temperature, is employed to cool down the film. The temperature of said cooling zone is therefore typically comprised between about 20 and about 40° C. At the end of the line, the edges of the film, that were grasped by the clips and have not been oriented, are trimmed off and the obtained bi-axially oriented, heat-shrinkable or heat-set film is then wound up, with or without prior slitting of the film web to the suitable width.

Subsequently, the film is wound up in a customary manner.

To allow recycling of the trimmed edges, or at least of part thereof, a multi-manifold die may preferably be employed in the co-extrusion so that the edges of the extruded tape that will be grasped by the clips are of a single polymer or polymer composition, typically, in the present process, the polymer(s) of the first outer layer.

The films thus obtained have a thickness variation of less than 10 percent, preferably less than 8 percent, and more preferably less than 5 percent.

Usually the polyester base films, if manufactured according to the present description, show a tear ratio higher than 37 gf/ micron and the Applicant has observed that tear initiation properties of the base films are substantially maintained in the corresponding coated films of the invention.

However, the skilled person can effect a selection of suitable base polyester films according to the invention by discharging those that do not comply because of too low values of tear ratios.

Accordingly, the skilled person, taking into account the reduction in tear ratio values due to the thickness increase associated with coating deposition, will be able to select a base film with a properly higher tear ratio in order to get a final coated film with a tear ratio of at least 37 gf/ micron.

In fact, if TB and TC represent the thickness of the base and coated films respectively, TRC represents the desired tear ratio of the coated film and assuming that the tear initiation force is approximately the same for the base and the coated film, the minimum tear ratio of the base film (TRB) may be calculated according to the following formula I

TRB=TC/TB×TRC

For instance, considering the case of a base film of 33 micron of thickness (TB) coated with a coating of 4 micron thus providing a coated film of 37 micron (TC), and assuming that the tear initiation forces for the base film and for the coated film are roughly the same, it follows that a base film suitable to provide a coated film with a tear ratio of at least 37 gf/ micron (TRC) according to the invention shall have a tear ratio of at least 41.5 gf/ micron (TRB).

In case of increase or decrease of the tear initiation force, the skilled in the art, guided by the present description and examples, will be able to select the base film suitable to provide the coated film of the invention with the desired tear ratio and seal/peal properties.

The films thus obtained may then be subjected to a corona discharge treatment to improve the print receptivity characteristics of the film surface.

Preferably, however, the base films are not corona treated.

In some embodiments, the films according to the present invention are corona treated before applying the heat sealable coating.

The heat-sealable coating may be applied on the base film at any one of the following stages of the base film production process: (i) between longitudinal and transverse stretching phase, when sequential orientation process is performed; (ii) after the final transversal stretching or the simultaneous stretching or iii) after the annealing phase.

Solvent-based coatings are preferably applied after the transversal stretching or the annealing phase whereas water-based coatings are preferably applied before the transversal stretching step.

Preferred heat-sealable coating for the present process contains from 20 to 50% by weight of terephthalic acid units, from 5 to 25% by weight of naphthalene dicarboxylic acid units, from 10 to 25% by weight of neopentyl glycol, from 10 to 25% by weight of diethylene glycol and from 10 to 25% by weight of ethylene glycol units. More preferred heat-sealable coatings contains from 30 to 40% by weight of terephthalic acid units, from 13 to 19% by weight of naphthalene dicarboxylic acid units, from 15 to 21% by weight of neopentyl glycol, from 11 to 17% by weight of diethylene glycol and from 14 to 20% by weight of ethylene glycol units.

The heat-sealable coating is applied to the base film by any suitable conventional technique such as dip coating, bead coating, reverse roller coating, gravure coating or slot coating.

Prior to application of the heat-sealable coating onto the base film, the exposed surface may be subjected to a chemical or physical surface-modifying treatment to improve the adhesion between that surface and the subsequently applied coating. A preferred treatment is to subject the exposed surface of the substrate to a high voltage electrical stress accompanied by corona discharge. Other suitable treatment are plasma and flame ones (this latter is to be used when applying coating prepared with non-flammable solvents). Alternatively, the substrate may be pre-treated with a chemical primer.

A third object of the present invention is a package comprising a container, a product and a lid made of the bi-axially oriented coated polyester film of the first object of the present invention sealed onto said container.

Typically, the surface of the container in contact with the product, i.e. the surface involved in the formation of the seal with the lidding film, comprises a polyester resin, usually an amorphous polyester resin (APET). For instance, the container can be made of cardboard coated with polyester or it can be integrally made of a polyester resin. Examples of suitable containers for the package of the invention are CPET, APET, APET/CPET, either foamed or not-foamed, i.e. solid, or, even more surprisingly, aluminium containers.

The package is produced by techniques well-known to those skilled in the art. Once the food to be packaged has been introduced into the container, the bi-axially oriented coated polyester film of the invention is sealed to the container by means of temperature and/or pressure using conventional techniques and equipment. The film is placed on the container such that the heat-sealable coating is in contact with the surface of the container. Sealing is carried out by means of a heated frame at temperatures of from 100° C. to 200° C., from 120° C. to 200° C., from 140° C. to 200° C., from 160° C. to 200° C. at a pressure of 2 to 10 bar, 4 to 8 bar. Sealing times are typically in the order of 0.3 to 2.0 seconds, 0.5 to 1.0 seconds. The heat generated by the sealing frame, regardless of the short sealing times, promotes the shrinkage of the film in both directions without distortion of the container to give a taut hermetically sealed lid. No film excess is needed to seal the container as the shrink of the film takes place only after the film is tightly held between the sealing frame and the rim of the container. The package is suitable for use with ready-prepared foods, so-called "ready-meals", which are intended to be warmed in a microwave oven or in any other type of oven, such as a conventional convection oven, a direct radiation oven and a forced hot air oven.

The package is particularly suitable for moist or respiring products such as fruits, vegetables and cheese.

A fourth object of the present invention is a bag or multi-compartment tray-less package with a rigid frame made of the bi-axially oriented coated polyester film of the first object of the present invention sealed onto itself.

In packaging, the product will be loaded into a bag made of the film of the invention, the bag can be optionally evacuated, and the open end thereof will be closed by heat-sealing or by applying a clip, e.g. of metal. A common method of packaging food and non-food products is by means of pouches made on form-fill-seal machines, such as a Horizontal Form-Fill-Seal (HFFS) or a Vertical Form-Fill Seal (VFFS) machine.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube in case of a VFFS machine, and a transverse sealer for sealing the tubular film in a cross-wise direction to separate the products into discrete packages. The transverse sealer may be operated to simultaneously seal the bottom of the leading pouch and the front of the following pouch and sever the two seals as well as the leading package from the front sealed tubing.

Alternatively, in the HFFS process, the transverse seal may be operated to sever the leading package from the following tubular portion and sealing the front of said tubular portion thus creating the sealed bottom of the next leading pouch. In this way, the leading pouch containing the product to be packaged has a longitudinal seal and only one transverse seal. It can then be vacuumized before a second transverse seal hermetically closes it. Also in this case, the oriented heat-shrinkable thermoplastic film of the present invention is employed as the packaging material and the vacuumized package is then shrunk to achieve the desired appearance.

In the FFS processes, while the transverse seals are always fin seals, the longitudinal seal can be either a fin seal or a lap seal, i. e. a seal where the heat sealable layer of the film is sealed to the outermost layer of the same film.

The outermost or external layer must also be carefully selected for its heat resistance during the sealing step. For example, it is advantageous to select for this layer a polymer having melting point higher than the sealing temperature.

A bag from a film of the invention has wide applications, preferably for food packaging, particularly for meat, poultry, cheese, processed and smoked meat, pork and lamb. The shrink properties of the film can be tailored to guarantee an appropriate shrinkage of the bag around the product. As the films according to the present invention have very good mechanical properties, the bag will have proper abuse resistance in order to mechanical physically survive the process of being filled, evacuated, sealed, closed, heat shrunk, boxed, shipped, unloaded, and stored at the retail supermarket, and a sufficient stiffness to improve also its loading process.

A multi-compartment tray-less package with a rigid frame as intended in the present invention is described in EP2765092.

A fifth object of the present invention is the use of the bi-axially oriented coated polyester film according to the first object of the present invention for packaging food, preferably for cooking applications, such as ready meals, or for packaging moist or respiring products.

Apart from the uses described hereinbefore, the films according to the present invention can advantageously be used for the manufacturing of the multi-compartment trayless package with a rigid frame described in EP2765092.

EXAMPLES

The present invention can be further understood by reference to the following examples that are merely illustrative and are not to be interpreted as a limitation to the scope of the present invention that is defined by the appended claims.

In the following examples, the polymers and coatings indicated in Table 1 below have been employed.

TABLE 1

| Tradename/ Supplier | Chemical Nature | Acronym | Properties & Parameters |
|---|---|---|---|
| EASTAR PETG 6763 - Eastman Chemical | Polyethylene Terephthalate/Glycol (copolyester of terephthalic acid, about 33 mole % 1,4-cyclohexane dimethanol and about 67 mole % ethylene glycol) | PETG1 | Density 1.27 g/cm$^3$, Glass Transition 81° C., Melt Flow Rate (Cond. 200° C./05.00 kg (G)) 2.8 g/10 min, Viscosity Solution 0.75 mPa.sec |
| SUKANO G dc S503 - Sukano | AntiBlock and Slip in Polyethylene Terephthalate/Glycol - Amorphous Silica and Ester Wax | PETG2 | Additives (SiO2) 10%, Additives (Wax) 6%, Bulk (Apparent) Density 1.2 g/cm$^3$, Vicat Softening Point 82° C. |
| GN001 - Eastman Chemical | Polyethylene Terephthalate/Glycol | PETG3 | Density 1.27 g/cm$^3$, Glass Transition 81° C., Viscosity Solution 0.75 mPa.sec |
| BYNEL 4104 (2006) - DuPont | Maleic Anhydride-Modified Ethylene/Butene Copolymer | LLDPE-mod | Density 0.92 g/cm$^3$, Melt Flow Rate (Cond. 190° C./02.16 kg (E)) 1.10 g/10 min, Melting point 125° C. |
| EASTAPAK COPOLYESTER 9921 - Eastman Chemical | Polyester, copolymer of polyethylene terephthalate | PET1 | Density 1.40 g/cm$^3$, Melting Point 255.0° C. |
| RAMAPET N180, Indorama | Polyester, copolymer of terephthalic acid, isophthalic acid and mono-ethylene glycol | PET2 | Density 1.4 g/cm$^3$, Intrinsic Viscosity 0.80 dl/g, Glass transition temperature 78° C., Melting point 245° C. |
| Therm-flex 5908 (Hold-Flex 5908), Akzo Nobel | heat sealable coating in ethyl acetate comprising surfactant ditridecyl-sulfosuccinate as antifog agent and a resin so composed: 34% of terephthalic acid units, 16% of naphthalene dicarboxylic acid units, 19% of neopentyl glycol units, 17% of ethylene glycol units, 14% of diethylene glycol units (% by weight) | COAT1 | Solids 33-37%, specific gravity 1.00-1.02 g/ml, viscosity Ford cup DIN4 at 25° C. 70-100 secs; glass transition T at 22.5° C. |
| Eastek 1400, Eastman Chemical | sulfopolyester | COAT2 | Viscosity Brookfield 15 cP, ph 6, density at 20° C. 1.08 g/cm$^3$, glass transition temperature 29° C., solids 30%; about 30% polyester in 70% water |

TABLE 1-continued

| Tradename/Supplier | Chemical Nature | Acronym | Properties & Parameters |
|---|---|---|---|
| Paramelt 161013D, Paramelt | Ethylene-vinyl acetate copolymer | COAT3 | Liquid, solids 50% in water, Viscosity Brookfield target 150 mPas; pH 10 |
| Eastek 1100, Eastman Chemical | Polyester made by condensation reaction, isophthalic acid (IPA), 5-(sodiosulfo)isophthalic acid (SSIPA), ethylene glycol (EG), diethylene glycol (DEG) and 1,4-cyclohexane-dimethanol (CHDM); (9% mol SSIPA and 23% mol CHDM, remainder IPA and DEG) | COAT4 | Liquid with 33% solids in water, boiling point 100° C. |
| Adcote 37R972E, Dow | Water based, Ethylene-vinyl acetate copolymer | COAT5 | Density 0.98 g/cm$^3$; viscosity solution Brookfield 90 mPAs in water |
| Aqualene 1188 HS, Aqua Based Technologies | Water based, Ethylene-vinyl acetate copolymer | COAT6 | In water, solids 45% in water, pH 8.8, density 1.02 g/cm$^3$; specific gravity 1.05-1.07 ($H_2O$ = 1) |
| Aquaprint VP-RT-112, Actega Terra | Ethylene-vinyl acetate copolymer | COAT7 | Liquid, density at 20° C. of 1.04 g/cm$^3$, ph 7-9.5, solids 40-45% in water; viscosity DIN 4 mm cup at 20° C. of 20 and 40 secs |

The examples according to the invention and the comparative examples have been collected in Table 2.

TABLE 2

Examples and comparative examples

| No. | Structure details and total thickness | COATING thickness grammage weight/area (solution composition) | Layer 1 (sealant) | Layer 2 | Layer 3 (external) |
|---|---|---|---|---|---|
| Ex. 1 | 19.0 micron (17.5 + 1.5) corona treated before coating | COAT1 1.5 micron 1.7 g/m$^2$ (70% coating/30% ethyl acetate) | 58% PETG1 18% LLDPE-mod 24% PET2 (2.0 micron) | 60% PET2 40% PETG1 (12.0 micron) | 98% PET2 2% PETG2 (3.5 micron) |
| Ex. 2 | 19.0 micron (17.5 + 1.5) not corona treated before coating | COAT1 1.5 micron 1.7 g/m$^2$ (70% coating/30% ethyl acetate) | | | |
| Ex. 3 | 18.5 micron (17.5 + 1.0) corona treated before coating | COAT1 1.0 micron 1.0 g/m$^2$ (70% coating/30% ethyl acetate) | | | |
| Ex. 4 | 18.5 micron (17.5 + 1.0) not corona treated before coating | COAT1 1.0 micron 1.0 g/m$^2$ (70% coating/ 30% ethyl acetate) | | | |
| Ex. 5 | 35.0 micron (33 + 2.0) corona treated before coating | COAT1 2.0 micron 1.9 g/m$^2$ (70% coating/ 30% ethyl acetate) | 58% PETG1 18% LLDPE-mod 24% PET2 (2.5 micron) | 60% PET2 40% PETG1 (24 micron) | 98% PET2 2% PETG2 (6.5 micron) |
| Ex. 6 | 19.5 micron (17.5 + 2.0) corona treated before coating | COAT1 2.0 micron 1.9 g/m$^2$ (70% coating/30% ethyl acetate) | 85% PETG1 15% LLDPE-mod (2.0 micron) | 60% PET2 40% PETG1 (13.5 micron) | 98% PET2 2% PETG2 (2.0 micron) |
| Ex. 7 | 19.5 micron (17.5 + 2.0) corona treated before coating | COAT1 1.5 micron 1.9 g/m$^2$ (70% coating/30% ethyl acetate) | 58% PETG1 18% LLDPE-mod 24% PET2 (2.0 micron) | 60% PET2 40% PETG1 (13.5 micron) | 98% PET2 2% PETG2 (2.0 micron) |
| Ex. 8 | 19.0 micron (17.5 + 1.5) not corona treated before coating | COAT1 1.5 micron 1.9 g/m$^2$ (80% coating/20% ethyl acetate) | 58% PETG1 18% LLDPE-mod 24% PET2 (2.0 micron) | 60% PET2 40% PETG1 (12.0 micron) | 98% PET2 2% PETG2 (3.5 micron) |

TABLE 2-continued

| | | | Examples and comparative examples | | |
|---|---|---|---|---|---|
| Ex. 9 | 27.0 micron (25 + 2.0) not corona treated before coating | COAT1 2.0 micron 1.9 g/m² (80% coating/20% ethyl acetate) | 58% PETG1 18% LLDPE-mod 24% PET2 (3.0 micron) | 60% PET2 40% PETG1 (17.0 micron) | 98% PET2 2% PETG2 (5 micron) |
| Ex. 10 | 35 micron (33 + 2.0) not corona treated before coating | COAT1 2.0 micron 1.9 g/m² (80% coating/20% ethyl acetate) | 58% PETG1 18% LLDPE-mod 24% PET2 (2.5 micron) | 60% PET2 40% PETG1 (24.0 micron) | 98% PET2 2% PETG2 (6.5 micron) |
| C1 | 17.5 micron | — | 58% PETG1 18% LLDPE-mod 24% PET2 (2.0 micron) | 60% PET2 40% PETG1 (13.5 micron) | 98% PET2 2% PETG2 (2.0 micron) |
| C2 | MYLAR OLAF - DuPont Teijin Film, biaxially oriented (sequential), antifog and heat sealable | — | polyethylene terephthalate (25 micron) | | |
| C3 | 25 micron | — | 100% PETG3 (3.7 micron) | 60% PET1 40% PETG3 (17.6 micron) | 98% PET1 2% PETG2 (3.7 micron) |
| C4 | 25 micron corona treated before coating | COAT 7 5.7 g/m² (80% coating/ 20% water) | | | |
| C5 | 25 micron corona treated before coating | COAT7 4.2 g/m² (60% coating/40% water) | | | |
| C6 | 25 micron corona treated before coating | COAT7 6.2 g/m² (90% coating/10% water) | | | |
| C7 | 25 micron corona treated before coating | COAT4 5.1 g/m² (100% coating) | | | |
| C8 | 25 micron corona treated before coating | COAT4 4.0 g/m² (80% coating/ 20% water) | | | |
| C9 | 25 micron corona treated before coating | COAT4 3.0 g/m² (60% coating/ 40% water) | | | |

| No. | STRUCTURE | COATING | LAYER 1 | LAYER 2 | LAYER 3 |
|---|---|---|---|---|---|
| C10 | 25 micron corona treated before coating | COAT2 4.6 g/m² (100% coating) | 100% PETG3 (3.7 micron) | 60% PET1 40% PETG3 (17.6 micron) | 98% PET1 2% PETG2 (3.7 micron) |
| C11 | 25 micron corona treated before coating | COAT2 3.7 g/m² (80% coating/20% water) | | | |
| C12 | 25 micron corona treated before coating | COAT2 2.8 g/m² (60% coating/40% water) | | | |
| C13 | 25 micron corona treated before coating | COAT3 5.0 g/m² (60% coating/40% water) | | | |
| C14 | 25 micron corona treated before coating | COAT3 3.3 g/m² (40% coating/60% water) | | | |
| C15 | 25 micron corona treated before coating | COAT4 5.1 g/m² (100% coating) | 100% PET1 (3.7 micron) | 60% PET1 40% PETG3 (17.6 micron) | 98% PET1 2% PETG2 (3.7 micron) |
| C16 | 25 micron corona treated before coating | COAT4 4.0 g/m² (80% coating/20% water) | | | |

TABLE 2-continued

| | | Examples and comparative examples | | | |
|---|---|---|---|---|---|
| C17 | 25 micron corona treated before coating | COAT4 3.0 g/m² (60% coating/40% water) | | | |
| C18 | 25 micron corona treated before coating | COAT2 4.6 g/m² (100 coat) | | | |
| C19 | 25 micron corona treated before coating | COAT2 3.7 g/m² (80% coating/20% water) | | | |
| C20 | 25 micron corona treated before coating | COAT2 2.8 g/m² (60% coating/40% water) | | | |
| C21 | 25 micron corona treated before coating | COAT5 4.4 g/m² (60% coating/ 40% water) | 100% PETG3 (3.7 micron) | 60% PET1 40% PETG3 (17.6 micron) | 98% PET1 2% PETG2 (3.7 micron) |
| C22 | 25 micron corona treated before coating | COAT5 5.9 g/m² (80% coating/ 20% water) | | | |
| C23 | 25 micron corona treated before coating | COAT5 5.1 g/m² (70% coating/ 30% water) | | | |
| C24 | 25 micron corona treated before coating | COAT6 4.4 g/m² (60% coating/ 40% water) | | | |
| C25 | 25 micron corona treated before coating | COAT6 5.9 g/m² (80% coating/ 20% water) | | | |
| C26 | 25 micron corona treated before coating | COAT6 5.1 g/m² (70% coating/ 30% water) | | | |
| C27 | 17.5 micron | — | 85% PETG1 15% LLDPE-mod (2.0 micron) | 60% PET2 40% PETG1 (13.5 micron) | 98% PET2 2% PETG2 (2.0 micron) |
| C28 | MYLAR OL, 19-DuPont Teijin Film, biaxially oriented (19 micron), heat sealable | — | polyethylene terephthalate (19 micron) | — | — |

Table 2 also reports whether or not the films were corona treated before applying the coating and the dilution of the coatings used.

All the above mentioned films, except C2 and C28 (which are commercially available materials manufactured by DuPont) were manufactured through a Flat Coextrusion process followed by in-line simultaneous Tenterframe orientation. Main operating conditions used to stretch and heat-set the films are summarized here below:

MD ratio: 3.6:1;
TD ratio: 3.6:1;
Pre-heating temperature: 98° C.;
Stretching Temperature: 98° C.;
Heat-setting Temperature: 210° C.

The films so obtained were cooled down first by an air flow at 30° C. and then by passing onto a cooling roll that was cooled with water and kept at 20° C.

Except as otherwise indicated in Table 2, the films were corona treated immediately before coating using a two-units corona treater each having power 2.5 KW.

For examples 1 to 7, the coating material COAT1 (heat sealable coating in ethyl acetate comprising units of terephthalic acid, naphthalene dicarboxylic acid, neopentyl glycol, ethylene glycol, diethylene glycol; surfactant ditridecyl-sulfosuccinate) was diluted in ethyl acetate (70% coating, 30% ethyl acetate) reaching a viscosity at 25° C. of 17 secs measured according to test method Ford cup DIN4. For examples 8 to 10, the coating material COAT1 was diluted in ethyl acetate (80% coating, 20% ethyl acetate).

The coating materials COAT2 to COAT7 were diluted, when needed, with water, with the percentages of dilution reported in Table 2.

The set-up of the coating line (coater DCM) was as follows:

line speed: 100 m/min; 120 m/min only for Examples 8, 9, 10;

engraved roll: 70 lines/cm; 60 lines/cm only for Examples 8, 9, 10;

drying temperature of the 3 subsequent ovens: 80° C.-80° C.-80° C.

The coated films were cooled down, before being wound up, by passing onto a roll that was cooled with water and kept at 20° C.

Sealant layer (layer 1) was coated. The coating grammage thus obtained was reported in Table 2. Table 3 reports the testing methods used for the characterization of the films of the Examples, the Comparative Examples and of the packages thus obtained.

TABLE 3

Test methods.

| Property | Test method |
| --- | --- |
| Free shrink | ASTM D2732 |
| Haze | ASTM D1003 |
| Gloss 60° | ASTM D2457 |
| Antifog | Internal method see description below |
| Puncture at 23° C. | Internal method see description below |
| Elastic Modulus at 23° C. | ASTM D882 |
| Tensile Strength and Elongation at break at 23° C. | ASTM D882 |
| Tear Initiation | ASTM D1004 |
| Hermeticity | Internal method see description below; burst test according to ASTM 03078-84 |
| Seal strength | Internal method see description below |
| Peelability | Internal method see description below |
| Oxygen permeability | ASTM D-3985 |
| Glass transition temperature (Tg) | ASTM E-1356 |

Free Shrink: it is the percent dimensional change in a 10 cm×10 cm specimen of film when subjected to a selected heat; it has been measured following ASTM Standard Test Method D 2732, immersing the specimen for 5 seconds in a heated oil bath at various temperatures. The results of this test are reported in Tables 5a and 5b.

Haze: it has been evaluated following ASTM D1003. The results of this test are reported in Tables 5a and 5b.

Gloss 60°: it has been evaluated following ASTM D2457. The average value of the measurements performed in longitudinal and transverse directions was reported. The results of this test are reported in Tables 5a and 5b.

Antifog Test (Score)

A packaging film is defined as "antifog" if its internal surface allows the droplets of water to lay as a smooth and uniform layer allowing visual inspection of the packaged product.

An internal test method was used to evaluate the antifog performance of the coated film. 250 ml of water were placed in a 900 ml glass vessel. The film was then secured through a rubber band tightly over the vessel; the sealant side of the film was placed towards the water without being into contact with the liquid. The vessel was then placed in a refrigerated cooler at 2-4° C. Three vessels were prepared for each film.

The specimens so prepared were then observed after 1, 3, 6, 24 and 48 hours or at least for 24 hours and scored by three panellists according to the following rating scale, ordered from very poor to excellent antifog properties:

score 1: opaque layer of small fog droplets;
score 2: opaque or transparent layer of large droplets;
score 3: complete layer of large transparent droplets;
score 4: randomly distributed or large transparent droplets;
score 5: transparent film without visible water.

The final antifog score is the average of three panellists' judgment. The results of this test are reported in Tables 5a and 5b.

Maximum shrink tension ($kg/cm^2$) and residual cold shrink tension (at 5° C.) ($kg/cm^2$) were measured through an internal method.

The maximum shrink tension is the maximum value of the tension developed by the materials during the heating/shrinking process. Specimens of the films (2.54 cm×14.0 cm, of which 10 cm are free for testing) are cut in the longitudinal (LD) and transverse (TD) directions of the film and clamped between two jaws, one of which is connected to a load cell. The two jaws keep the specimen in the center of a channel into which an impeller blows heated or cold air and two thermocouples measure the temperature. The thermocouples are positioned as close as possible (less than 3 mm) to the specimen and in the middle of the same. The signals supplied by the thermocouples (which is the testing temperature) and by the load cell (which is the force) are sent to a computer where the software records these signals. The impeller starts blowing hot air and the force released by the sample is recorded in grams. The temperature is increased from 23° C. to 180° C. at a rate of about 2.1° C./second by blowing heated air and then decreased from 180° C. to 5° C. at a rate of 0.9° C./second by blowing cold air. The maximum shrink tension is calculated by dividing the maximum force value in kg (force at peak) by the specimen width (expressed in cm) and by the specimen average thickness (expressed in cm) and is expressed as $kg/cm^2$. The residual cold shrink tension is calculated by dividing the force (in kg) exerted by the specimen at 5° C. and the specimen width (in cm) and the specimen average thickness (in cm) and is expressed as $g/cm^2$. Three specimens were measured for each film in each direction. The results of this test are reported in Tables 5a and 5b.

Puncture at 23° C.: the puncture resistance is the resistance force arising when pushing a punch against a surface of flexible film. A film sample is fixed in a specimen holder connected to a compression cell mounted on a dynamometer (an Instron tensile tester); when the dynamometer is started, a punch (a punching sphere, 5-mm in diameter, soldered on a plunger) is brought against the film sample (sealant layer) at a constant speed (30 cm/min) and the force needed to puncture the sample is graphically recorded. This test is representative of the abuse resistance of the packaging films. The results of this test are reported in Tables 5a and 5b.

Elastic modulus at 23° C.: it has been evaluated following ASTM D 882. The results of this test are reported in Tables 5a and 5b.

Tensile Strength and Elongation at break (ASTM D 882).

Tensile strength represents the maximum tensile load per unit area of the original cross-section of the test specimen required to break it, expressed as $kg/cm^2$.

Elongation at break represents the increase in length of the specimen, measured at the moment of rupture expressed as percentage of the original length. Measurements were performed with Instron tensile tester equipped with a load cell type CM (1-50 kg), in an environmental chamber set at 23° C., on specimens previously stored at 23° C. and 50% RH for minimum of 24 hours. Tensile and elongation measurements were recorded simultaneously and the reported results are the average values. The results of this test are reported in Tables 5a and 5b.

Tear Initiation (ASTM D1004): it has been evaluated following ASTM D1004.

In this method, resistance to tear is calculated from the maximum load recorded during the test. The higher the tear initiation force, the higher the resistance of the film to tear initiation. Dynamometer Instron 5564 was used, being equipped with a load cell of ±10 N.

The materials were conditioned for 5 days at 50% RH and 23° C., cut, and tested under the same conditions. The specimens were prepared by cutting them according to the shape and die dimensions reported in the ASTM (see ASTM FIG. 1).

For each material, i.e. the coated films of the invention and the comparative films, ten specimens for each directions were tested and the average value was reported in Tables 5a and 5b.

The same procedure may be adopted for measuring the tear initiation force of the base films. The average total thickness for each tested material was confirmed to be the same as reported in Table 2.

The average tear initiation force was reported in grams-force (instead of pounds-force suggested in ASTM D1004). Tables 5a and 5b also reports the standard deviation values. The same Table also reports the tear ratio between the tear initiation average forces and the average total thickness of the films. This tear ratio is expressed as gf/micron.

Hermeticity

Hermeticity of the seals was evaluated according to an internal test method. The packages were manufactured on a Proseal GTO machine at different sealing temperatures and times as reported in Table 8a and 8b. The film of Ex. 1 according to the present invention and comparative examples C1 and C2 were sealed onto black Faerch rectangular CPET tray C 2155-1E (1316-50). The seals were "clean", i.e. the films were sealed onto the tray keeping the tray flange under clean (i.e. non-contaminated) conditions (no product was packaged). The packages so obtained were put in a closed water tank. Vacuum was created in the headspace of the water tank and the value of the pressure (bar) inside the tank when bubbles start to escape from the closed packages was recorded. Twenty packages were tested for each sealing condition and the average pressure value was recorded. The packs fit for use have to stand at least to −0.30 bar. The average pressure was reported in Table 8a and 8b.

Burst Test

Hermeticity of the seals of the packages of the invention and of comparative packages was also evaluated according to the "burst test".

This test was performed according to the standard method of ASTM 03078-84, modified as follows. A first assessment of the hermeticity was done by subjecting each package to a pressure of −300 mbar for 1 minute.

If the package withstood these conditions showing no leaks after 1 minute, the pressure in the chamber was further decreased up to the package burst and the negative pressure at which leaking started was measured (max burst pressure).

If the sample burst earlier than one minute, we measured the time passed before the first leaks appeared (hermeticity time before burst or holding time, in seconds)

The burst test was performed just after packaging; holding time (secs) as average value out of 15 packages tested for each film/tray combination is reported in Table 8d.

Seal Strength: an internal test method was used to evaluate this property.

The films according to the invention and the comparative examples were sealed at different sealing conditions and onto various trays (details in Tables 4, 6a, 6b, 6c, 7 and 8c) and, for each film, the seal strength was measured on 3 trays for each sealing condition. From each tray, 4 specimens were cut. A total of 12 specimens were then tested for each sealing conditions.

The specimens were cut out from each package by using the following procedure: two parallel lines 25.4mm (1 inch) apart from each other were drawn at the centre of the 4 sides as illustrated in FIG. 1;

the film was cut following the drawn lines starting from the short side and continuing cutting on the long side;

the tray was then cut following the marks thus obtaining four specimens 25.4 mm wide where the film was still attached to the tray flange.

The seal strength measurement was performed through a dynamometer with a crosshead speed of 300 mm/min and setting up an initial jaw separation of 20 mm. The specimen was clamped in the jaws (the film was clamped in the upper jaw which is movable during the test and the tray on the lower jaw which is fixed) in such a way that the seal is horizontally positioned at equal distance from the two jaws. The test was then started, the crosshead moved up until the seal was broken. The instrument recorded the force needed to open the seal in grams. The average value, among the 12 measured, was reported, see Table 8c.

Peelability: the films according to the invention and the comparative examples were sealed at different sealing conditions and onto various trays (details in Tables 6a, 6b, 6c, 7, 8a, 8b, 8c and 8d) and, for each film, the peelability was manually tested by two panellists opening at least 10 packs each. The average comment was reported.

Oxygen Permeability: oxygen permeability was evaluated according to ASTM D-3985 at 0% of relative humidity (RH) and 23° C. Three specimens were tested for each film, the average results were reported in Tables 5b.

Glass Transition Temperature (Tg)

Glass transition temperatures of the heat sealable coatings, previously heated in a metal cup positioned onto a water bath kept at 90° C. for 1 hour to evaporate the volatile components, were measured with a Q2000 differential scanning calorimeter (TA Instruments) according ASTM E-1356.

The samples were heated and cooled under nitrogen, according to the following heating and cooling sequential steps:

First heating ramp 10.00° C./min to 100.00° C.
Isothermal for 0.50 min
First cooling ramp 10.00° C./min to −70.00° C.
Isothermal for 3.00 min
Second heating ramp 10.00° C./min to 100.00° C.
Isothermal for 3.00 min
Second cooling ramp 200.00° C./min to −70.00° C.
Isothermal for 6.00 min
Third heating ramp 3.00° C./min to 100.00° C.
Equilibrate at 32.00° C.

The Tg was calculated, as per ASTM E-1356 and by using the software of the instrument, on the DSC curve recorded in the second heating ramp as the midpoint Tg.

For example, Therm-flex 5908 (Hold-Flex 5908, COAT1) from Akzo Nobel, under these experimental conditions, resulted to have an average Tg of 22.40° C. (three samples were tested, the average value was calculated).

Sealing Performance of Comparative Films Coated with Conventional Known Coatings Comparative films C3 to C27 were sealed at the conditions reported in Table 4 to tray INFIA K37 APET 400-micron monolayer using a PROSEAL GTO machine.

As shown in Table 4, the majority of the tested films showed no sealing, namely the film do not attach to the tray flange, or show a weak/very very weak sealing to the tray flange. Only comparative films C10, C11, C18, C19 and C20 have a good although irregular sealing; however, these films show no peel due to high tear. Moreover comparative films C24, C25 and C26 show high sticking, namely the films stick on themselves when rolled up.

TABLE 4

| Film | 80° C./1.5 s | 90° C./1.5 s | 100° C./1.5 s | 110° C./1.5 s | 120° C./1.5 s | sticking |
|---|---|---|---|---|---|---|
| C3 | no sealing | no sealing | no sealing | no sealing | very very weak | no |
| C4 | no sealing | no sealing | no sealing | very very weak | weak sealing | no |
| C5 | no sealing | no sealing | no sealing | very very weak | weak sealing | no |
| C6 | no sealing | no sealing | no sealing | very very weak | weak sealing | no |
| C7 | no sealing | no sealing | no sealing | no sealing | weak sealing | no |
| C8 | no sealing | no sealing | no sealing | no sealing | weak sealing | no |
| C9 | no sealing | no sealing | no sealing | no sealing | weak sealing | no |
| C10 | no sealing | no sealing | no sealing | weak sealing | good but irregular sealing. No peel due to high tear | no |
| C11 | no sealing | no sealing | no sealing | weak sealing | good but irregular sealing. No peel due to high tear | no |
| C12 | no sealing | no sealing | no sealing | no sealing | weak sealing + tear | no |
| C13 | no sealing | no sealing | no sealing | no sealing | very very weak | no |
| C14 | no sealing | no sealing | no sealing | no sealing | very very weak | no |
| C15 | no sealing | no sealing | no sealing | no sealing | very very weak | no |
| C16 | no sealing | no sealing | no sealing | no sealing | very very weak | no |
| C17 | no sealing | no sealing | no sealing | no sealing | weak sealing | no |
| C18 | no sealing | no sealing | no sealing | good but irregular sealing. No peel due to high tear | good but irregular sealing. No peel due to high tear | no |
| C19 | no sealing | no sealing | no sealing | good but irregular sealing. No peel due to high tear | good but irregular sealing. No peel due to high tear | no |
| C20 | no sealing | no sealing | no sealing | good but irregular sealing. No peel due to high tear | good but irregular sealing. No peel due to high tear | no |
| C21 | no sealing | no sealing | no sealing | no sealing | very very weak | no |
| C22 | no sealing | no sealing | no sealing | no sealing | very very weak | no |
| C23 | no sealing | no sealing | no sealing | no sealing | very very weak | no |
| C24 | no sealing | no sealing | no sealing | very very weak | very very weak | high sticking |
| C25 | no sealing | no sealing | no sealing | very very weak | very very weak | high sticking |
| C26 | no sealing | no sealing | no sealing | very very weak | very very weak | high sticking |
| C27 | no sealing | no sealing | no sealing | very very weak | Borderline/ Acceptable | |

As can be seen from Table 4, no one of the comparative films provided an acceptable seal/peal performance.

Table 5a and 5b show the physical properties of some films of the invention and of comparative examples.

TABLE 5a

| | | C28 | C1 | C27 | Ex. 1 | Ex. 5 | Ex. 6 | Ex. 7 |
|---|---|---|---|---|---|---|---|---|
| elastic modulus | LD | 42200 | | | 35400 | | | |
| (Kg/cm$^2$) | TD | 45300 | | | 29500 | | | |
| tensile strength | LD | 1870 | | | 1840 | | | |
| (Kg/cm$^2$) | TD | 2070 | | | 1500 | | | |
| elongation at | LD | 150 | | | 120 | | | |
| break (%) | TD | 110 | | | 150 | | | |
| puncture resistance (g) | | 4510 | | | 3480 | | | |
| tear initiation/ | LD | 660/40 | 750/20 | | 750/20 | 1460/50 | | 750/20 |
| std deviation | TD | 660/50 | 760/20 | | 760/20 | 1420/40 | | 730/20 |
| (gf) | | | | | | | | |

TABLE 5a-continued

|  |  | C28 | C1 | C27 | Ex. 1 | Ex. 5 | Ex. 6 | Ex. 7 |
|---|---|---|---|---|---|---|---|---|
| Total film thickness (micron) | | 19.0 | 17.5* | 17.5* | 19.0 | 35.0 | 19.5 | 19.5 |
| tear ratio (gf/micron) | LD | 35 | 43 | | 39.5 | 42 | | 38.5 |
| | TD | 35 | 44 | | 40 | 41 | | 37.4 |
| free shrink % LD/ % TD | 100° C. | −3/−4 | | | 0/0 | | | |
| | 120° C. | −4/−4 | | | 2/1 | | | |
| | 140° C. | −3/−4 | | | 3/2 | | | |
| | 160° C. | −4/−4 | | | 4/3 | | | |
| shrink tension max (Kg/cm²) | LD | 18 | | | 25 | | | |
| | TD | 17 | | | 11 | | | |
| residual shrink tension (g/cm²) | LD | 364 | | | 402 | | | |
| | TD | 370 | | | 393 | | | |
| gloss 60° (g.u.) | | 136 | 141 | 124 | 140 | 141 | 149 | 140 |
| haze (%) | | 6 | 6 | 7.4 | 8 | 10 | 6 | 10 |
| Antifog | 1 h | 3 | | | 5 | | | |
| | 3 h | 4 | | | 5 | | | |
| | 6 h | 4 | | | 5 | | | |
| | 24 h | 5 | | | 5 | 5 | 5 | 5 |
| | 48 h | 5 | | | 5 | | | |

*non-coated

TABLE 5b

|  |  | Ex. 8 | Ex. 9 | Ex. 10 |
|---|---|---|---|---|
| elastic modulus (Kg/cm²) | LD | 34400 | 33970 | 32990 |
| | TD | 35770 | 35770 | 35670 |
| tensile strength (Kg/cm²) | LD | 1920 | 1860 | 1820 |
| | TD | 1990 | 1950 | 2020 |
| elongation at break (%) | LD | 170 | 150 | 140 |
| | TD | 140 | 120 | 120 |
| tear initiation/ std deviation (gf) | LD | 850/24 | 1270/27 | 1680/35 |
| | TD | 820/29 | 1240/39 | 1680/53 |
| Total film thickness (micron) | | 19 | 27 | 35 |
| tear ratio (gf/micron) | LD | 45 | 47 | 48 |
| | TD | 43 | 46 | 48 |
| free shrink % LD/% TD | 140° C. | 3/3 | 2/3 | 2/3 |
| shrink tension max (Kg/cm²) | LD | 18 | 13 | 12 |
| | TD | 16 | 14 | 14 |
| residual shrink tension (g/cm²) | LD | 427 | 588 | 739 |
| | TD | 368 | 544 | 695 |
| gloss 60° (g.u.) | | 147 | 143 | 142 |
| haze (%) | | 9 | 9 | 9 |
| Antifog | 24 h | 5 | 5 | 5 |
| Oxygen permeability | (0% RH, 23° C.) | 145 | 98 | 74 |

The films according to the invention are characterised by very good mechanical, optical and antifog properties and by high tear initiation forces and tear ratios.

This high tear ratio, in combination with the specific coating of the invention, allows one to use very thin film meanwhile avoiding tearing, which would otherwise result in a difficult and unpleasant opening of the package.

By using the film of the present invention, the opening of the package is accompanied by a clean peeling even after cooking in microwave or conventional oven, (see Tables 8a, 8b, 8c, 8d) and the seal force required to open the package is optimal for the final consumer.

The film according to the invention is further characterised by tailored shrink properties. Higher free shrink values than the comparative example 28 allows one to obtain good pack tightness. The lower values of the maximum shrink tension in TD is particularly beneficial to avoid or minimise tray distortion along the long (typically LD) side. In fact, for rectangular trays, the longer side (LD) is more subjected to distortion phenomena due to the shrink force in the transverse direction.

Residual shrink tensions under cold conditions higher than those of comparative films further allow to keep a good pack tightness even after storage in the fridge. It has in fact been observed that during storage in the fridge some packs may relax and loose some of their tightness then developing unpleasant pleats.

Packages with APET Trays

The films of Ex. 1 to Ex. 7 according to the invention and the film comparative example C28 were sealed on various APET trays (see Tables 6a-6c and 7). Such trays differ for total thickness, mechanical resistance and sealant layer and are particularly used in the packaging of moist or respiring products, as fruits, vegetables or cheese.

The seal strength values measured on the obtained packages were reported in Tables 6a-6c and 7. Tables 6a-6c: seal strength values measured on packages obtained by sealing with Proseal GT0 machine on various APET trays (sealing conditions and films used are indicated).

TABLE 6a

Proseal GT0 machine

| | tray APET Infia rectangular clear tray K28 film | | | | |
|---|---|---|---|---|---|
| | C28 | Ex. 1 | Ex. 4 | Ex. 5 | Ex. 6 |
| sealing conditions | | | seal strength (g) | | |
| 110° C., 0.5 secs | 198 | 204 | — | 400 | 283 |
| 120° C., 0.5 secs | 263 | 433 | 232 | 858 | 619 |
| 130° C., 0.5 secs | 375 | 529 | 407 | 817 | 649 |
| 160° C., 0.5 secs | | | | 863 | 692 |

TABLE 6b

| | APET Sharpac SPS85 rectangular clear tray | | | | APET Sharpac BB50 rectangular clear tray | |
|---|---|---|---|---|---|---|
| tray film | C28 | Ex. 1 | Ex. 5 | Ex. 6 | C28 | Ex. 1 |
| sealing conditions | | seal strength (g) | | | seal strength (g) | |
| 100° C., 1.5 secs | | | | | 100 | 311 |
| 110° C., 0.5 secs | 281 | 418 | 753 | 567 | | |
| 110° C., 1.0 secs | | | | | 170 | 708 |
| 120° C., 0.5 secs | 310 | | 782 | 622 | | |

TABLE 6b-continued

|  | APET Sharpac SPS85 rectangular clear tray | | | | APET Sharpac BB50 rectangular clear tray | |
|---|---|---|---|---|---|---|
| tray film | C28 | Ex. 1 | Ex. 5 | Ex. 6 | C28 | Ex. 1 |
| sealing conditions | seal strength (g) | | | | seal strength (g) | |
| 120° C., 1.0 secs |  |  |  |  | 291 | 699 |
| 130° C., 0.5 secs | 425 | 580 | 755 | 664 |  |  |
| 130° C., 1.0 sec |  |  |  |  | 359 | 680 |
| 140° C., 0.5 secs | 432 |  | 792 | 725 |  |  |
| 160° C., 0.5 secs | 494 |  | 800 | 763 |  |  |

TABLE 6c

|  | tray: APET Infia rectangular clear tray K37 film: | | | | |
|---|---|---|---|---|---|
|  | C28 | Ex. 1 | Ex. 2 | Ex. 3 | Ex. 4 |
| sealing conditions | seal strength (g) | | | | |
| 100° C., 1 sec | 275 | 216 | 185 | 168 | 145 |
| 110° C., 0.5 secs | 385 | 264 | 214 | 214 | 138 |
| 120° C., 0.5 secs | 571 | 396 | 374 | 238 | 231 |
| 130° C., 0.5 secs | 646 | 459 | 363 | 281 | 237 |
| 140° C., 0.5 secs | 719 | 610 |  |  | 356 |

Table 7: seal strength values measured on packages obtained by sealing with Proseal GTR machine on two APET trays (sealing conditions and films used are indicated).

TABLE 7

| Proseal GTR machine | | | | |
|---|---|---|---|---|
|  | tray | | | |
|  | APET Anson tray 44566-01 rectangular, clear | | Coveris/Kobush Waitrose RPET 89381 tray, 300 micron at flange | |
|  | film | | | |
|  | C28 | Ex. 5 | C28 | Ex. 5 |
| sealing conditions | seal strength (g) | | seal strength (g) | |
| 135° C., 0.4 secs | 659 | 751 | 540 | 686 |

The packages were also visually inspected for appearance and manually opened by two panellists. The tray were not distorted after the sealing cycle and the packages were tight.

In addition, very good and clean peelability was observed by opening the packages comprising the films according to the invention. In particular, no tearing was observed at manually opening the packages, even at fast opening.

Comparative film C28 showed in some cases tearing especially at fast opening of the packages. Data reported in Tables 6a-c further demonstrate that:

the films according to the invention are able to reach peelable seal strength values at sealing temperatures in the range 100-130° C. depending on the tray used, even at low sealing times (0.5 secs);

it might be advantageous corona treating the film before applying the heat sealable coating (see Ex. 2 and Ex. 4 that resulted in lower seal strength values compared to the other examples) in order to reach higher seal strength values at lower sealing temperatures (which are advantageous to minimise the tray distortion); however, corona treatment is not essential, as demonstrated by the seal strength value measured for the film of Ex. 2 sealed at 120° C. on Infia tray K37 at 120° C. for 0.5 secs.

a lower grammage value (1.0 g/m$^2$, Ex. 3 and 4) results in lower seal strength compared to higher grammage (1.7 and 1.9 of Ex. 1, 2, 5, 6);

the films according to the invention, especially if corona treated before coating and especially at higher coating grammage (1.7 g/m$^2$ for example) generally allow one to reach good seal strength values and appropriate peelability at lower temperature than C28 film.

In addition, all the films according to the invention did not show tearing at the opening of the packages. The films of Ex. 8 to Ex. 10 according to the invention were sealed on APET Infia rectangular clear trays K37-50 (see Tables 6d).

The seal strength values measured on the obtained packages were reported in Tables 6d: seal strength values were measured on packages obtained by sealing with Proseal GT0 machine on Infia rectangular clear trays K37-50 (sealing conditions and films used are indicated).

TABLE 6d

|  | tray: APET Infia rectangular clear tray K37-50 film: | | |
|---|---|---|---|
|  | Ex. 8 | Ex. 9 | Ex. 10 |
| sealing conditions | seal strength (g) | | |
| 120° C., 0.5 secs | 669 | 705 | 1041 |
| 130° C., 0.5 secs | 766 | 1002 | 1065 |
| 140° C., 0.5 secs | 772 | 1064 | 1130 |
| 150° C., 0.5 secs | 808 | 1056 | 1258 |
| 160° C., 0.5 secs | 820 | 1126 | 1331 |
| 180° C., 0.5 secs | 848 | 1123 | 1340 |

Having assigned a score 1 (acceptable), 2 (good) or 3 (excellent), the majority of the obtained packages reported in Table 6a resulted to give at least a good peel strength perception at manual opening at the different sealing temperatures.

The peel strength perception at manual opening of the package comprising the film of Ex. 10 was considered excellent (score=3) at sealing temperatures of 140° C., 150° C. and 160° C.

Packages with CPET Trays

The films of the present invention can also be advantageously used for packages to be heat-treated, for example for pasteurization as well as regeneration or cooking in the oven (either microwave or conventional oven). For this application, CPET tray are typically used.

Faerch rectangular black tray C 2155-1E (1316-50, length 155.2 mm, width 127.2 mm, depth 49.7 mm) was used as CPET tray to be sealed on C1, C2 and Ex.1.

The packages were obtained by sealing the films to the tray on a ProSeal GT0 machine.

Sealing time was 0.5 secs. Sealing temperatures were reported in Tables 8a and 8b.

The sealing force and the peelability at opening were manually judged by two panellists and the average outcomes were reported.

Furthermore, the hermeticity value was measured for each sealing conditions and combination of tray and film.

TABLE 8a

| Tray | feature | sealing temperature (° C.) | | | | |
|---|---|---|---|---|---|---|
| | | 120 | 130 | 140 | 150 | 160 |
| CPET Faerch C2155-1E + Ex. 1 | seal peel hermeticity (–) bar | good good 0.35 | good good 0.36 | good good 0.36 | good good 0.36 | good good 0.36 |
| CPET Faerch C2155-1E + C2 | seal peel hermeticity (–) bar | good sticking 0.34 | good start tearing 0.37 | good tear 0.36 | good tear 0.37 | good tear 0.39 |
| CPET Faerch C2155-1E + C1 | seal peel hermeticity (–) bar | poor poor no seal | poor poor no seal | just acceptable just acceptable weak seal | good good 0.32 | good good 0.35 |

TABLE 8b

| Tray | feature | sealing temperature (° C.) | | | | | |
|---|---|---|---|---|---|---|---|
| | | 170 | 180 | 190 | 200 | 210 | 220 |
| CPET Faerch C2155-1E + Ex. 1 | seal peel hermeticity (–) bar | good good 0.36 | good good 0.38 | good good 0.39 | good good 0.39 | good good 0.39 | good good 0.39 |
| CPET Faerch C2155-1E + C2 | seal peel hermeticity (–) bar | good tear 0.40 | good tear 0.39 | good tear 0.41 | good tear 0.41 | good tear 0.43 | good tear 0.42 |
| CPET Faerch C2155-1E + C1 | seal peel hermeticity (–) bar | good good 0.36 | good good 0.36 | good good 0.38 | good good 0.40 | good good 0.39 | good good 0.39 |

The film according to the invention provided for better peelability and hermeticity at lower temperatures than the films of comparative examples. In addition, no tearing was observed for Ex. 1 even at higher sealing temperatures and even at fast opening of the packages.

Packages with Aluminium Trays

It has been surprisingly found that the films according to the invention can also seal onto aluminium tray.

Sealing tests were done by using the film of Ex. 8, 9 and 10 and rectangular Aluminium tray AS221037 by I2R (external dimensions at flange 200 mm×155 mm, internal dimensions at flange 184 mm×139 mm, bottom base 170 mm×125 mm, depth 47 mm, volume 1037 cm3). The machine used to manufacture the package was PACKAGING AUTOMATION SL3. The sealing condition applied was 200° C. for 1.5 secs.

After the packaging steps, twenty packages were manually opened by two analysts reporting appropriate seal force and very good peelability. No tearing of the film was observed.

The films according to the invention of the Ex 8, 9 and 10 were sealed on aluminium trays AS221086-101 sold by I2R.

A Rotary 178 Semi-Automatic tray sealer was used, equipped with one single cavity for foil trays of dimensions of 220×130 mm, with no film cutting and no injection of gas or vacuum. A flat sealing bar of 8 mm width and rubber of 6 mm flat profile with a hardness of 50/60 shore was used with the following sealing conditions:

Minimum Seal Temperature: 190° C.-200° C.
Minimum Seal Time: 1.5-2.0 sec
Seal Pressure: 10kg/cm² (12 springs on the sealing bar)
Seal Bar profile: 8 mm flat
Contrast bar rubber: 6 mm flat, 50/60 Shores
Insulator plate: yes (silicon on the front and aluminum on the back)

The seal strength values measured on the obtained packages were reported in Table 8c.

TABLE 8c

| | Rotary 178 Semi-Automatic tray sealer | | | |
|---|---|---|---|---|
| | tray | | | |
| | (Aluminium) AS221086-101 | | (Aluminium) AS221086-101 | |
| | film | | | |
| | Ex. 9 | | Ex. 10 | |
| sealing conditions | seal strength (g) | | seal strength (g) | |
| 200° C., 2.0 secs | 1091 | 1293 | 1267 | 1371 |

As can be appreciated from the seal strength values, which are particularly high for this specific difficult application (i.e. plastic film sealed onto aluminium), the films of the invention provide for good seals even when sealed onto aluminium trays. These high values of seal strength are predictive of good performance under cooking in conventional oven.

The obtained packages were submitted to the burst test performed according to ASTM 03078-84 modified as previously described. The burst test was performed just after packaging.

Holding time (secs) as average value out of 15 packages tested for each film/tray combination is reported in Table 8d.

TABLE 8d

| | aluminum tray AS221086-101 by I2R sealed onto: | | |
|---|---|---|---|
| SEALING CONDITIONS: | Ex 8 | Ex. 9 | Ex. 10 |
| | holding time (secs) | | |
| 190° C., 1.5 secs | 60 | 27 | 26 |
| 200° C., 1.5 secs | not measured | 31 | 34 |

As can be appreciated from the data reported in Table 8d the packages made from the film of the present invention, in particular from the film of Ex. 8, and an aluminium tray provide for good hermeticity. The values of holding time before burst reported above, are in line with market hermeticity standard and confirm that the films of the present invention can be advantageously sealed also onto aluminium trays.

Following the burst test, all the packages were manually opened.

The packages made from the films of the present invention showed a nice peelability with removal of the lid film in one piece.

Sealing Through Contamination Test

Packages were manufactured by sealing—using a ProSeal GTO machine for 0.5 secs at the temperatures reported in Table 9—the films of Ex.7, Ex.5 and Ex.8 to Ex. 10 respectively to APET INFIA rectangular trays K-37-50 400 um.

Sealing was performed under contaminated and non-contaminated conditions. For this purpose, a group of trays were contaminated on the flange along the two long sides of the tray only by brushing with a paper towel soaked in vegetable oil so that the oil settles gently on the rim without dripping from the flange.

The hermeticity of the packages of the invention was measured for each sealing conditions and combination of tray and film, either in the group of non-contaminated (6+6) and contaminated (12+12) packages.

TABLE 9

| | sealing temperature (° C.) | 120 | 130 | 140 | 150 | 160 | 180 |
|---|---|---|---|---|---|---|---|
| No contamination | | | | | | | |
| APET INFIA K-37-50 + Ex. 7 Hermeticity (–) bar | | 0.28 | 0.33 | 0.34 | 0.33 | 0.33 | 0.33 |
| APET INFIA K-37-50 + Ex. 5 Hermeticity (–) bar | | 0.23 | 0.25 | 0.29 | 0.30 | 0.33 | 0.33 |
| APET INFIA K-37-50 + Ex. 8 Hermeticity (–) bar | | 0.28 | 0.33 | 0.34 | 0.33 | 0.33 | 0.33 |
| APET INFIA K-37-50 + Ex. 9 Hermeticity (–) bar | | 0.23 | 0.31 | 0.32 | 0.32 | 0.32 | 0.36 |
| APET INFIA K-37-50 + Ex. 10 Hermeticity (–) bar | | 0.23 | 0.25 | 0.29 | 0.30 | 0.33 | 0.33 |
| Contaminated seal | | | | | | | |
| APET INFIA K-37-50 + Ex. 7 Hermeticity (–) bar | | 0.28 | 0.27 | 0.31 | 0.32 | 0.33 | 0.34 |
| APET INFIA K-37-50 + Ex. 5 Hermeticity (–) bar | | 0.20 | 0.21 | 0.26 | 0.23 | 0.24 | 0.29 |
| APET INFIA K-37-50 + Ex. 8 Hermeticity (–) bar | | 0.28 | 0.27 | 0.31 | 0.32 | 0.33 | 0.34 |
| APET INFIA K-37-50 + Ex. 9 Hermeticity (–) bar | | 0.25 | 0.25 | 0.28 | 0.29 | 0.29 | 0.32 |
| APET INFIA K-37-50 + Ex. 10 Hermeticity (–) bar | | 0.20 | 0.21 | 0.26 | 0.23 | 0.24 | 0.29 |

The test shows that the films of the present invention can also be advantageously used with contaminated trays. In fact, the values of hermeticity of these packages even in the presence of contaminating oil in the sealing area are more than acceptable for market standards.

Re-sealing Test With and Without Contamination

Thirty packages obtained by sealing to APET INFIA rectangular trays K-37-50 400 micron the films of Ex.7 using a ProSeal GTO machine, were opened with complete removal of the film from the tray; then on the same non contaminated trays another film of Ex. 7 was sealed and hermeticity of the packages was tested. The same procedure was applied to thirty packages obtained by sealing to APET INFIA rectangular trays K-37-50 400 micron the films of Ex.8; after opening the resultant packages, with complete removal of the film from the tray, another film of Ex. 8 was sealed on the same non contaminated trays. Twenty packages obtained in the same conditions reported above, were opened with complete removal of the film from the tray; then on the same trays, another film of Ex. 7 was sealed after having contaminated the tray with vegetable oil and hermeticity of the package was tested. The same procedure was applied to twenty packages obtained by sealing to APET INFIA rectangular trays K-37-50 400 micron the films of Ex.8.

Sealing time was 0.5 secs. Sealing temperatures and hermeticity data were reported in Table 10.

TABLE 10

| | | sealing temperature (° C.) | 120 |
|---|---|---|---|
| Resealing without contamination | | | |
| APET INFIA K-37-50 + Ex. 7 | hermeticity (—) bar | | 0.30 |
| APET INFIA K-37-50 + Ex. 8 | hermeticity (—) bar | | 0.30 |
| Resealing with contaminated seal | | | |
| APET INFIA K-37-50 + Ex. 7 | hermeticity (—) bar | | 0.24 |
| APET INFIA K-37-50 + Ex. 8 | hermeticity (—) bar | | 0.24 |

The test shows that the film peels so well to allow a second use of the tray, also in conditions wherein the seal has been contaminated. In fact, the values of hermeticity of these resealed packages, even in the presence of contaminating oil in the sealing area, are still acceptable for market standards. This is important for customers who do not have to throw the tray away if the first packaging step went wrong for any reason (i.e. product was wrongly portioned or weighted or mispositioned or the package had an unsatisfactory appearance, etc.) or in any case in which recycling of the tray is desired.

Cooking Test

Moreover, the packages obtained by sealing at 200° C. for 0.5 secs (Tables 8a and 8b) were put in conventional oven at 200° C. for 60 minutes. All the packages showed self-venting feature (i.e. opening of the seal between the lid film and the tray in specific areas) during the cooking, namely: C1 package opened after 10 minutes in the oven, C2 package opened after 5 minutes and Ex.1 package opened after 1 minute.

The packages were manually completely opened after cooking and visually inspected.

The package lidded with C1 film showed good and clean peel at opening, but the tray visually appeared too much distorted; package having C2 film showed good peelability but some film tearing at opening; package having Ex.1 film showed good and clean peel at opening and tray distortion was significantly lower than for C1. Ex.1 differs from C1 only for the coating. This coating COAT1 allowed for a better peelability, then the film of Ex.1 started detaching from the flange during the cooking well before C1 film. As a result, the tray was less distorted during the cooking cycle.

Moreover, the cooking test was performed on a package made from film of Ex. 10 and an aluminum tray AS221086-101 (conditions Table 8d), containing beef with a sauce and sealed at 200° C. for 1.5 secs.

The film was pierced and the packages were placed into the conventional oven at 190° C. for 30 minutes. After the cooking test, two analysts evaluated the packages reporting a very good pack appearance with a very tight pack and a nice peelability.

No self-venting occurred during the cooking, further confirming that the sealing is strong enough without compromising the peelability. Finally, the lid was removed without any tearing, in one piece.

The invention claimed is:

1. A biaxially oriented coated polyester film comprising a polyester base film and a heat sealable coating wherein the heat sealable coating comprises (i) one or more amorphous copolyester(s) comprising units of terephthalic acid, naphthalene dicarboxylic acid, (ii) less than 2% by weight of any polymer that is incompatible with polyesters (anti-PET polymer) and (iii) at least a diol, and wherein the heat sealable coating contains from 20 to 50% by weight of terephthalic acid units and from 5 to 25% by weight of naphthalene dicarboxylic acid units, the biaxially oriented coated polyester film having a tear ratio, between the tear initiation force measured according to ASTM D-1004 and the coated film total thickness, of at least 37 gf/micron in at least one of longitudinal and transverse directions.

2. The film according to claim 1, wherein the tear ratio is at least 39 gf/micron in at least one of longitudinal and transverse directions.

3. The film according to claim 1, wherein the tear ratio is at east 39 gf/micron in both longitudinal and transverse directions.

4. The film according to claim 1, wherein free shrink in each direction is less than 5% at temperatures up to 140° C.

5. The film according to claim 1, wherein free shrink in each direction does not exceed 20% in the range of from 140° C. to 200° C.

6. The film according to claim 1, wherein the heat sealable coating contains at least one of from 30 to 40% by weight of terephthalic acid units and from 13 to 19% by weight of naphthalene dicarboxylic acid units.

7. The film according to claim 1, wherein the at least a diol of the heat sealable coating is selected from the group consisting of neopentyl glycol, diethylene glycol, ethylene glycol and their admixtures.

8. The film according to claim 1, wherein the heat sealable coating comprises from 10 to 25% by weight of neopentyl glycol, from 10 to 25% by weight of diethylene glycol and from 10 to 25% by weight of ethylene glycol.

9. The film according to claim 1, wherein the heat sealable coating contains from 30 to 40% by weight of terephthalic acid units, from 13 to 19% by weight of naphthalene dicarboxylic acid units, from 15 to 21% by weight of neopentyl glycol, from 11 to 17% by weight of diethylene glycol and from 14 to 20% by weight of ethylene glycol.

10. The film according to claim 1, wherein the heat sealable coating comprises less than 1% by weight of any polymer that is incompatible with polyesters (anti-PET polymer).

11. The film according to claim 1, wherein the heat sealable coating has a Tg value, measured by Differential Scanning Calorimeter according to ASTM E-1356 modified as in the present description, in the range from 10° C. to 70° C.

12. The film according to claim 1, wherein the heat-sealable coating has a dry coat weight (grammage) from 0.5 to 6.0 g/m$^2$.

13. The use of the biaxially oriented coated polyester film according to claim 1 for packaging food.

* * * * *